United States Patent
Kim et al.

(10) Patent No.: US 11,894,603 B2
(45) Date of Patent: Feb. 6, 2024

(54) ELECTRONIC DEVICE COMPRISING ANTENNA MODULE

(71) Applicants: Samsung Electronics Co., Ltd., Suwon-si (KR); POSTECH ACADEMY-INDUSTRY FOUNDATION, Pohang-si (KR)

(72) Inventors: Yeonwoo Kim, Suwon-si (KR); Wonbin Hong, Pohang-si (KR); Wonpyo Kwon, Pohang-si (KR); Sehyun Park, Suwon-si (KR); Sumin Yun, Suwon-si (KR)

(73) Assignees: Samsung Electronics Co., Ltd., Suwon-si (KR); POSTECH ACADEMY-INDUSTRY FOUNDATION, Pohang-si (KR)

(*) Notice: Subject to any disclaimer, the term of this patent is extended or adjusted under 35 U.S.C. 154(b) by 390 days.

(21) Appl. No.: 17/418,588

(22) PCT Filed: Dec. 31, 2019

(86) PCT No.: PCT/KR2019/018809
§ 371 (c)(1),
(2) Date: Jun. 25, 2021

(87) PCT Pub. No.: WO2020/141863
PCT Pub. Date: Jul. 9, 2020

(65) Prior Publication Data
US 2022/0069441 A1   Mar. 3, 2022

(30) Foreign Application Priority Data
Dec. 31, 2018   (KR) .................... 10-2018-0174050

(51) Int. Cl.
*H01Q 1/24*   (2006.01)
*H01Q 9/04*   (2006.01)
(Continued)

(52) U.S. Cl.
CPC .............. *H01Q 1/243* (2013.01); *H01Q 1/24* (2013.01); *H01Q 9/04* (2013.01); *H01Q 9/0407* (2013.01);
(Continued)

(58) Field of Classification Search
CPC ........ H01Q 1/243; H01Q 1/24; H01Q 9/0407; H01Q 9/04; H01Q 9/065; H01Q 9/06; H01Q 9/16
(Continued)

(56) References Cited

U.S. PATENT DOCUMENTS

| | | |
|---|---|---|
| 7,423,595 B2 | 9/2008 | Saily |
| 10,153,557 B2 | 12/2018 | Sudo |

(Continued)

FOREIGN PATENT DOCUMENTS

| | | |
|---|---|---|
| EP | 03367499 A1 | 8/2018 |
| KR | 10-2007-0069574 A | 7/2007 |

(Continued)

OTHER PUBLICATIONS

Korean Office Action with English translation dated Jan. 7, 2023; Korean Appln .No. 10-2018-0174050.
(Continued)

*Primary Examiner* — Hai V Tran
(74) *Attorney, Agent, or Firm* — Jefferson IP Law, LLP

(57) ABSTRACT

An electronic device is disclosed. The electronic device comprises: a first plate including a first planar region facing a first direction; a second plate comprising a second planar region facing a second direction opposite to the first direction; a housing including a side member surrounding an inner space between the first plate and the second plate; a display disposed between the first plate and the second plate and viewed through the first plate; and an antenna module disposed between the display and the second plate and
(Continued)

configured to emit electromagnetic waves to the outside of the housing. The antenna module comprises: an antenna substrate including a first surface facing the first plate, a second surface facing the second plate, and a third surface facing the inner surface of the side member; and a wireless communication circuit disposed on the first surface of the antenna substrate. The antenna substrate comprises: a first antenna adjacent to the first surface or formed on the first surface; a second antenna adjacent to the second surface or formed on the second surface; and a third antenna formed between the first antenna and the second antenna. The first antenna is formed at a first distance from the third surface, the second antenna is formed at a second distance from the third surface, and the third antenna may be formed at a third distance that is greater than the first distance and the second distance from the third surface. Various other embodiments inferred from the present specification are also possible.

15 Claims, 25 Drawing Sheets

(51) Int. Cl.
*H01Q 9/06* (2006.01)
*H01Q 9/16* (2006.01)

(52) U.S. Cl.
CPC ............... *H01Q 9/06* (2013.01); *H01Q 9/065* (2013.01); *H01Q 9/16* (2013.01)

(58) Field of Classification Search
USPC ........................................................ 343/810
See application file for complete search history.

(56) References Cited

U.S. PATENT DOCUMENTS

| | | | |
|---|---|---|---|
| 2007/0021159 A1* | 1/2007 | Kaneoya | H01Q 9/42 455/575.3 |
| 2007/0126641 A1 | 6/2007 | Saily | |
| 2008/0106478 A1* | 5/2008 | Hill | H01Q 1/38 343/702 |
| 2008/0174494 A1* | 7/2008 | Suzuki | H01Q 9/0407 343/700 MS |
| 2008/0316121 A1* | 12/2008 | Hobson | H01Q 1/243 343/702 |
| 2011/0175783 A1 | 7/2011 | Kim | |
| 2013/0300624 A1 | 11/2013 | Fakharzadeh Jahromi | |
| 2017/0222325 A1 | 8/2017 | Sudo | |
| 2019/0165472 A1* | 5/2019 | Yun | H04B 1/3888 |

FOREIGN PATENT DOCUMENTS

| | | |
|---|---|---|
| KR | 10-0922230 B1 | 10/2009 |
| KR | 10-1901101 B1 | 9/2018 |
| KR | 10-2018-0105833 A | 10/2018 |
| KR | 10-2018-0120004 A | 11/2018 |
| KR | 10-2020-0014601 A | 2/2020 |

OTHER PUBLICATIONS

Korean Notice of Allowance dated Jul. 23, 2023, issued in Korean Application No. 10-2018-0174050.

* cited by examiner

ELECTRONIC DEVICE COMPRISING ANTENNA MODULE

TECHNICAL FIELD

Embodiments of the disclosure relate to an electronic device including an antenna module.

BACKGROUND ART

As electronic devices have been recently popularized, the network traffic is sharply increasing due to the electronic devices (e.g., a smartphone). To make the traffic better, a next-generation mobile communication technology using a signal in an ultra-high-frequency band, for example, a $5^{th}$ generation (5G) mobile communication technology is being actively developed. The 5G mobile communication technology may provide a wider bandwidth compared to a conventional mobile communication technology and may make it possible to transmit and/or receive a significant amount of information.

DISCLOSURE

Technical Problem

To use the 5G mobile communication technology, an electronic device may include an antenna module. Because the antenna module for the 5G mobile communication technology has a great effective isotropically radiated power (EIRP), the antenna module may transmit and/or receive various kinds of data more effectively.

Radio wave radiation efficiency in a specific direction may be low depending on antennas included in the antenna module. For example, when an antenna module including patch antennas faces in the direction of a rear cover of the electronic device, the radio wave radiation efficiency in a lateral direction of the electronic device may be low. For another example, when an antenna module including dipole antennas faces a side surface of the electronic device, the radio wave radiation efficiency in the direction of the rear cover of the electronic device may be low.

Embodiments of the disclosure provide an antenna module capable of providing high radio wave radiation efficiencies in various directions and an electronic device including the same.

Technical Solution

According to an embodiment of the disclosure, an electronic device may include a housing including a first plate including a first planar region facing a first direction, a second plate including a second planar region facing a second direction opposite to the first direction, and a side member surrounding an inner space between the first plate and the second plate; a display disposed between the first plate and the second plate and viewable through the first plate; and an antenna module disposed between the display and the second plate and configured to radiate a radio wave to the outside of the housing, the antenna module may include an antenna substrate including a first surface facing the first plate, a second surface facing the second plate, and a third surface facing an inner surface of the side member, and a wireless communication circuit disposed on the first surface of the antenna substrate, the antenna substrate may include a first antenna formed adjacent to the first surface or formed on the first surface, a second antenna formed adjacent to the second surface or formed on the second surface, and a third antenna formed between the first antenna and the second antenna, the first antenna may be formed at a first distance from the third surface, the second antenna may be formed at a second distance from the third surface, and the third antenna may be formed at a third distance, which is smaller than the first distance and the second distance, from the third surface.

According to an embodiment of the disclosure, an electronic device may include a first plate forming a first surface of the electronic device; a second plate forming a second surface of the electronic device and facing away from the first plate; a side member forming a side surface of the electronic device, formed between the first plate and the second plate, and including a metal material; a display disposed between the first plate and the second plate and viewable through the first plate; an antenna substrate disposed between the display and the second plate and including a plurality of antennas; and a wireless communication circuit electrically connected with the plurality of antennas and disposed on one surface of the antenna substrate, the plurality of antennas may include a first dipole antenna extended toward the second plate, a second dipole antenna extended toward the first plate, and a third dipole antenna extended toward an inner surface of the side member and located more adjacent to the inner surface of the side member than the first dipole antenna and the second dipole antenna, and the wireless communication circuit may be configured to apply feeding signals to at least two of the plurality of antennas such that a beam coverage formed by the plurality of antennas is toward a side surface of the electronic device.

Advantageous Effects

According to embodiments of the disclosure, because an antenna module is configured to perform radiation in various directions, an electronic device may include antenna modules, the number of which is less than that of a conventional electronic device. Accordingly, a mounting space of the electronic device may be efficiently utilized.

According to embodiments of the disclosure, a wide radiation range may be secured by adjusting a phase of an electrical signal to be applied to an antenna module. As such, the coverage of the electronic device may widen, and thus, a stable wireless communication function may be provided.

Besides, a variety of effects directly or indirectly understood through this disclosure may be provided.

DESCRIPTION OF DRAWINGS

With regard to the description of the drawings, identical or similar reference numerals may be used to refer to identical or similar components.

MODE FOR INVENTION

Hereinafter, various embodiments of the disclosure will be described with reference to the accompanying drawings. However, those of ordinary skill in the art will recognize that modification, equivalent, and/or alternative on the various embodiments described herein can be variously made without departing from the scope and spirit of the disclosure.

Figure 1:
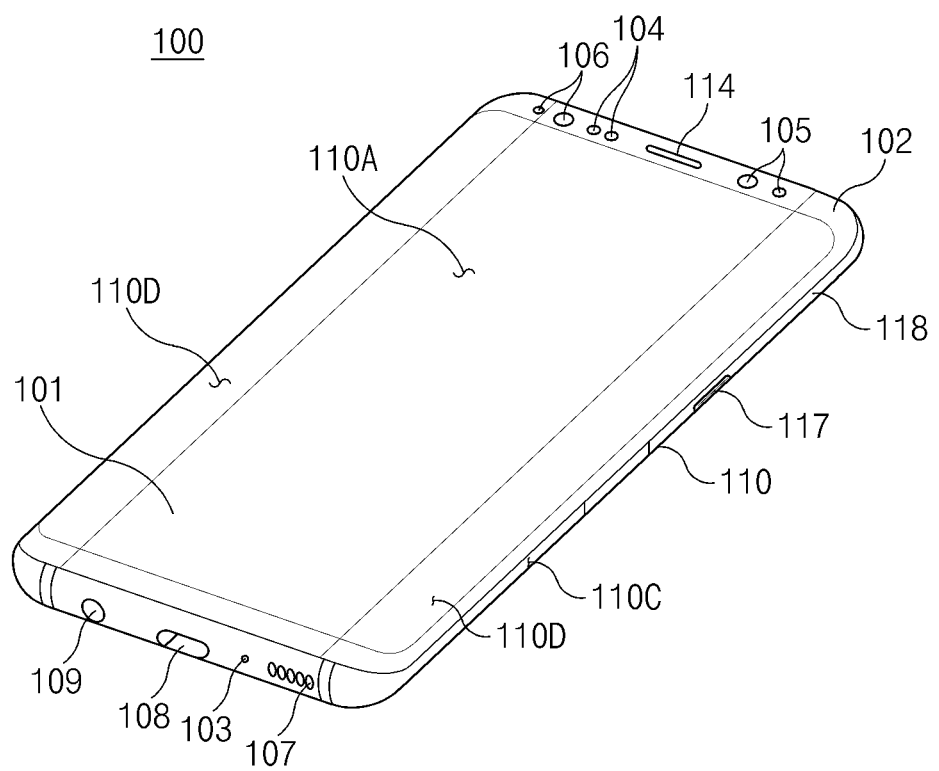
FIG. 1 is a front perspective view of an electronic device according to an embodiment.
Figure 2:
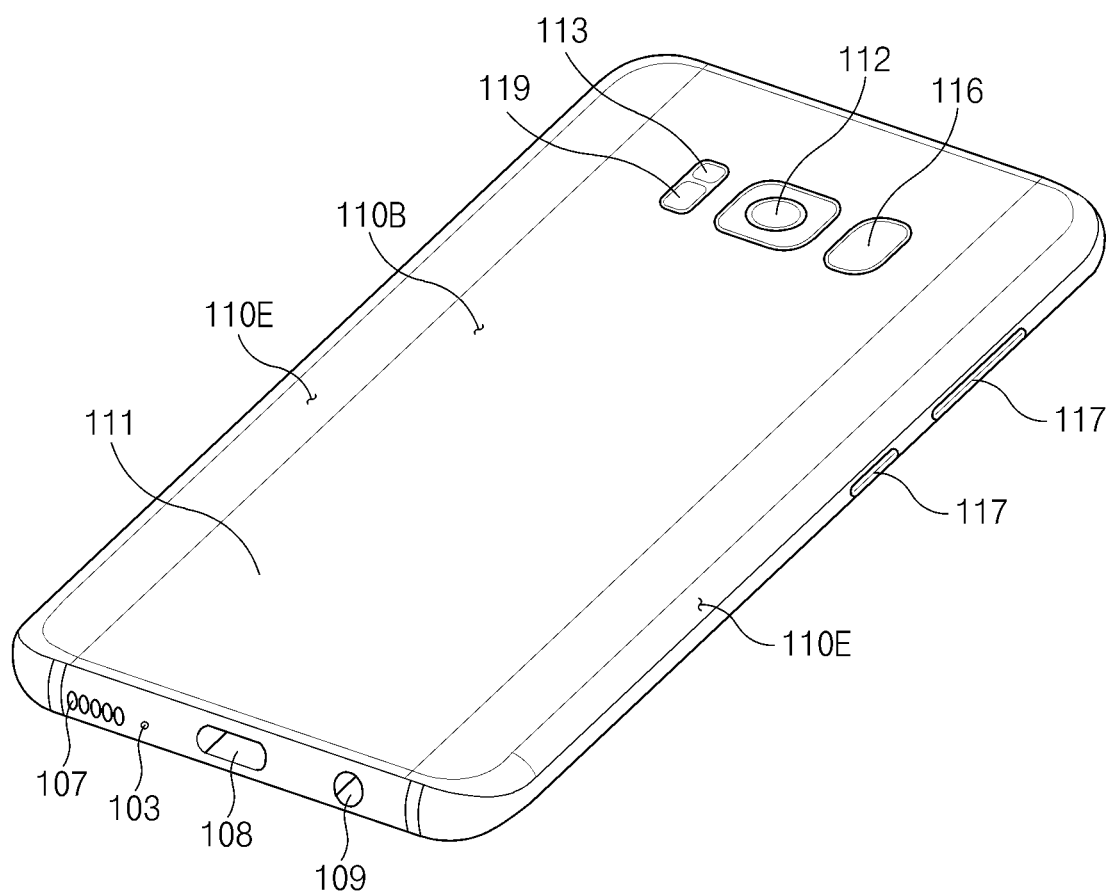
FIG. 2 is a back perspective view of an electronic device illustrated in FIG. 1.
Figure 3:
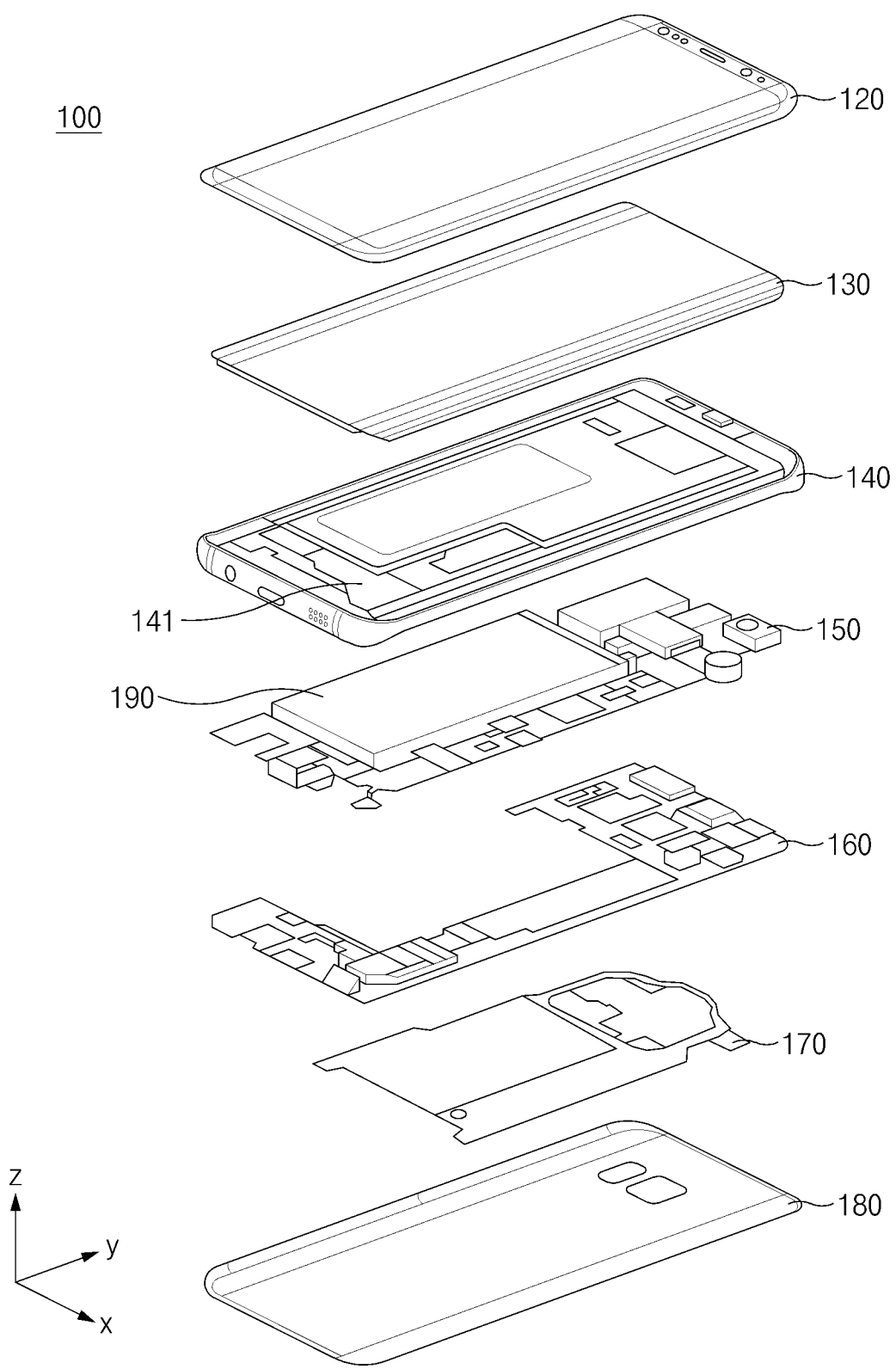
FIG. 3 is an exploded perspective view of an electronic device illustrated in FIG. 1.

FIG. 1 is a front perspective view of an electronic device according to an embodiment. FIG. 2 is a rear perspective view of the electronic device illustrated in FIG. 1. FIG. 3 is an exploded perspective view of the electronic device illustrated in FIG. 1.

Referring to FIGS. 1 and 2, the electronic device 100 according to an embodiment may include a housing 110 that includes a first surface (or a front surface) 110A, a second surface (or a rear surface) 110B, and side surfaces 110C that surround a space between the first surface 110A and the second surface 110B. In another embodiment (not illustrated), a housing may refer to a structure that forms some of the first surface 110A, the second surface 110B, and the side surfaces 110C of FIG. 1. According to an embodiment, the first surface 110A may be formed by a front plate 102, at least a portion of which is substantially transparent (e.g., a glass plate or a polymer plate that includes various coating layers). The second surface 110B may be formed by a rear plate 111 that is substantially opaque. The rear plate 111 may be formed of, for example, coated or colored glass, ceramic, a polymer, metal (e.g., aluminum, stainless steel (STS), or magnesium), or a combination of at least two thereof. The side surfaces 110C may be formed by a side bezel structure (or a "side member") 118 that is combined with the front plate 102 and the rear plate 111 and that contains metal and/or a polymer. In some embodiments, the rear plate 111 and the side bezel structure 118 may be integrally formed with each other and may contain the same material (e.g., a metallic material such as aluminum).

In the illustrated embodiment, the front plate 102 may include, at opposite long edges thereof, two first areas 110D that curvedly and seamlessly extend toward the rear plate 111 from the first surface 110A. In the illustrated embodiment (refer to FIG. 2), the rear plate 111 may include, at opposite long edges thereof, two second areas 110E that curvedly and seamlessly extend toward the front plate 102 from the second surface 110B. In some embodiments, the front plate 102 (or the rear plate 111) may include only one of the first areas 110D (or the second areas 110E). In another embodiment, some of the first areas 110D or the second areas 110E may not be included. In the embodiments, when viewed from a side of the electronic device 100, the side bezel structure 118 may have a first thickness (or width) at sides not including the first areas 110D or the second areas 110E and may have a second thickness smaller than the first thickness at sides including the first areas 110D or the second areas 110E.

According to an embodiment, the electronic device 100 may include at least one or more of a display 101, audio modules 103, 107, and 114, sensor modules 104, 116, and 119, camera modules 105, 112, and 113, key input devices 117, light emitting elements 106, and connector holes 108 and 109. In some embodiments, the electronic device 100 may omit at least one component (e.g., the key input devices 117 or the light emitting elements 106) among the components, or may additionally include other component(s).

The display 101 may be exposed through, for example, a large portion of the front plate 102. In some embodiments, at least a portion of the display 101 may be exposed through the front plate 102 that forms the first surface 110A and the first areas 110D of the side surfaces 110C. In some embodiments, the edge of the display 101 may be formed to be substantially the same as the shape of the adjacent periphery of the front plate 102. In another embodiment (not illustrated), the gap between the periphery of the display 101 and the periphery of the front plate 102 may be substantially constant to expand the area by which the display 101 is exposed.

In another embodiment (not illustrated), recesses or openings may be formed in a portion of a screen display area of the display 101, and the electronic device 100 may include at least one or more of the audio module 114, the sensor modules 104, the camera modules 105, and the light emitting elements 106 that are aligned with the recesses or the openings. In another embodiment (not illustrated), the electronic device 100 may include, on a rear surface of the screen display area of the display 101, at least one or more of the audio module 114, the sensor modules 104, the camera modules 105, the fingerprint sensor 116, and the light emitting elements 106. In another embodiment (not illustrated), the display 101 may be combined with, or disposed adjacent to, touch detection circuitry, a pressure sensor for measuring the intensity (pressure) of a touch, and/or a digitizer for detecting a stylus pen of a magnetic type. In some embodiments, at least a part of the sensor modules 104 and 119 and/or at least a part of the key input devices 117 may be disposed in the first areas 110D and/or the second areas 110E.

The audio modules 103, 107, and 114 may include the microphone hole 103 and the speaker holes 107 and 114. A microphone for obtaining a sound from the outside may be disposed in the microphone hole 103, and in some embodiments, a plurality of microphones may be disposed in the microphone hole 103 to sense the direction of a sound. The speaker holes 107 and 114 may include the external speaker hole 107 and the receiver hole 114 for a telephone call. In some embodiments, the speaker holes 107 and 114 and the microphone hole 103 may be implemented with one hole, and a speaker (e.g., a piezoelectric speaker) may be included without the speaker holes 107 and 114.

The sensor modules 104, 116, and 119 may generate an electrical signal or a data value that corresponds to an operational state inside the electronic device 100 or an environmental state outside the electronic device 100. The sensor modules 104, 116, and 119 may include, for example, the first sensor module 104 (e.g., a proximity sensor) and/or the second sensor module (not illustrated) (e.g., a fingerprint sensor) that is disposed on the first surface 110A of the housing, and/or the third sensor module 119 (e.g., an HRM sensor) and/or the fourth sensor module 116 (e.g., a fingerprint sensor) that is disposed on the second surface 110B of the housing 110. The fingerprint sensor may be disposed not only on the first surface 110A of the housing 110 (e.g., the display 101) but also on the second surface 110B. The electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illuminance sensor 104.

The camera modules 105, 112, and 113 may include the first camera device 105 disposed on the first surface 110A of the electronic device 100, and the second camera device 112 and/or the flash 113 disposed on the second surface 110B. The camera devices 105 and 112 may include one or more lenses, an image sensor, and/or an image signal processor. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surfaces 110C of the housing 110. In another embodiment, the electronic device 100 may not include all or some of the aforementioned key input devices 117, and the key input devices 117 not included may be implemented in different forms such as soft keys on the display 101. In some embodiments, the key input devices 117 may include the sensor module 116 disposed on the second surface 110B of the housing 110.

The light emitting elements 106 may be disposed on, for example, the first surface 110A of the housing 110. The light emitting elements 106 may provide, for example, state information of the electronic device 100 in the form of light. In another embodiment, the light emitting elements 106 may provide, for example, a light source that operates in conjunction with operation of the camera module 105. The light emitting elements 106 may include, for example, an LED, an IR LED, and a xenon lamp.

The connector holes 108 and 109 may include the first connector hole 108 in which a connector (e.g., a USB connector) for transmitting and receiving power and/or data with an external electronic device is received, and/or the second connector hole 109 (e.g., an earphone jack) in which a connector for transmitting and receiving audio signals with an external electronic device is received.

Referring to FIG. 3, the electronic device 100 may include a side member 140, a first support member 142 (e.g., a bracket), a front plate 120, a display 130, a printed circuit board 150, a battery 152, a second support member 160 (e.g., a rear case), an antenna 170, and a rear plate 180. In some embodiments, the electronic device 100 may omit at least one component (e.g., the first support member 142 or the second support member 160) among the aforementioned components, or may additionally include other component(s). At least one of the components of the electronic device 100 may be the same as, or similar to, at least one of the components of the electronic device 100 of FIG. 1 or FIG. 2, and repetitive descriptions will be omitted.

The first support member 142 may be disposed in the electronic device 100 and may be connected with the side member 140, or may be integrally formed with the side member 140. The first support member 142 may be formed of, for example, a metallic material and/or a nonmetallic (e.g., polymer) material. The first support member 142 may have one surface to which the display 130 is coupled and an opposite surface to which the printed circuit board 150 is coupled. The printed circuit board 150 may have a processor, a memory, and/or an interface mounted thereon. The processor may include one or more of, for example, a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface, for example, may electrically or physically connect the electronic device 100 with an external electronic device and may include a USB connector, an SD card/MMC connector, or an audio connector.

The battery 152 may be a device for supplying power to at least one component of the electronic device 100 and may include, for example, a primary cell that is not rechargeable, a secondary cell that is rechargeable, or a fuel cell. For example, at least a portion of the battery 152 may be disposed on substantially the same plane as the printed circuit board 150. The battery 152 may be integrally disposed in the electronic device 100 and may be disposed so as to be detachable from the electronic device 100.

The antenna 170 may be disposed between the rear plate 180 and the battery 152. The antenna 170 may include, for example, a near field communication (NFC) antenna, a wireless charging antenna, and/or a magnetic secure transmission (MST) antenna. For example, the antenna 170 may perform short range communication with an external device, or may wirelessly transmit and receive power required for charging. In another embodiment, an antenna structure may be formed by the side member 140 and/or a portion of the first support member 142, or a combination thereof.

Figure 4:
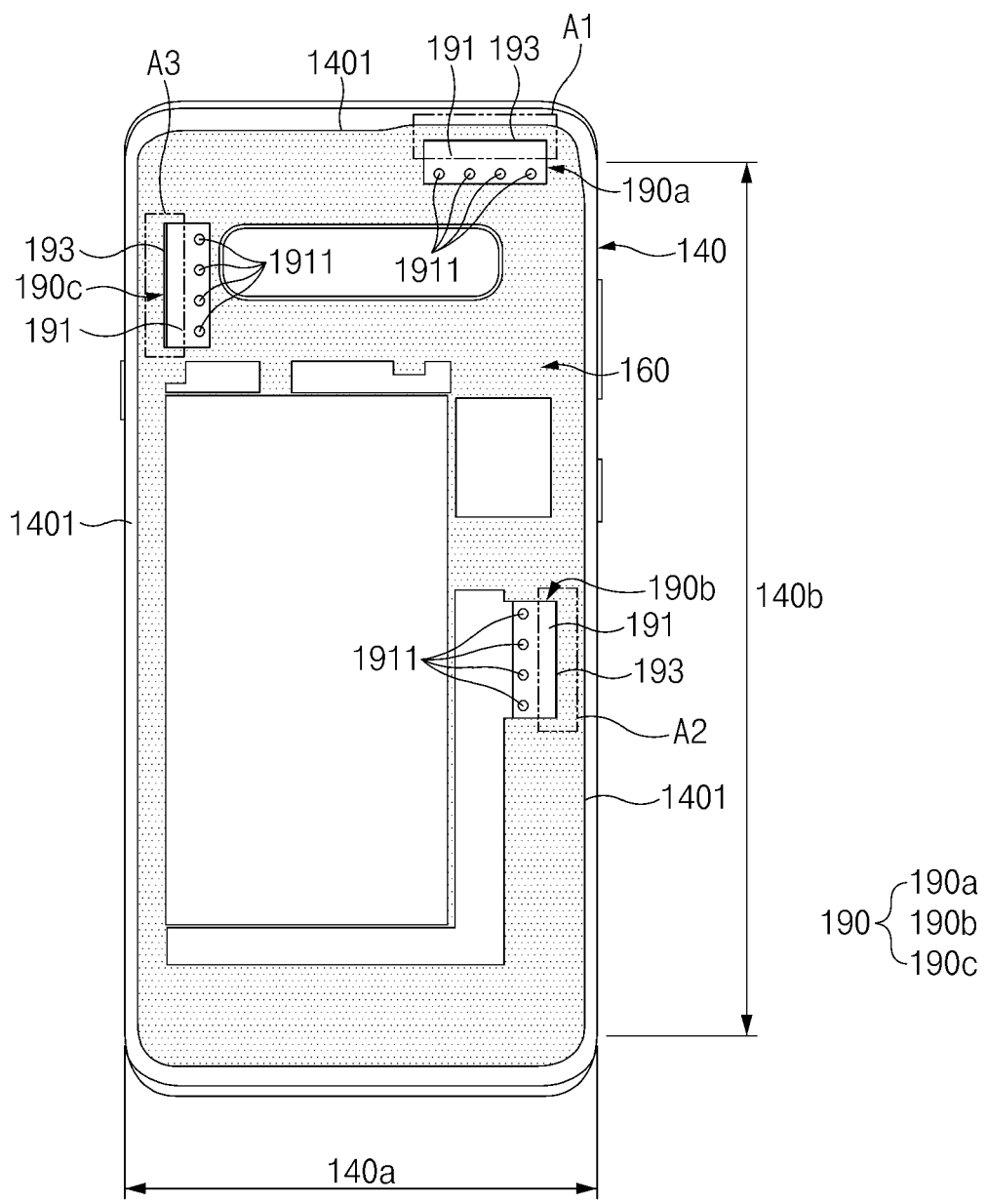
FIG. 4 is a view illustrating how an antenna module of an electronic device is disposed, according to an embodiment.

FIG. 4 is a view illustrating how an antenna module 190 of the electronic device 100 is disposed, according to an embodiment. FIG. 4 is a drawing in which a second plate of an electronic device illustrated in FIG. 3 is omitted.

Referring to FIG. 4, the electronic device 100 may include the housing 110, and one or more antenna modules 190 disposed within the housing 110.

In the illustrated embodiment, the housing 110 may protect various parts (e.g., a display and a battery) included in the electronic device 100 from external shocks, by forming the exterior of the electronic device 100.

In an embodiment, a side member 140 may include a pair of first portions 140a that have a first length and face each other, and a pair of second portions 140b that have a second length longer than the first length and face each other. The first portion 140a and the second portion 140b may be extended in substantially vertical directions. For example, the first portion 140a may be extended in an x-axis direction, and the second portion 140b may be extended in a y-axis direction.

In the illustrated embodiment, the side member 140 may be formed to surround a periphery of a mid-plate (e.g., the rear case 160 of FIG. 3). The one or more antenna modules 190 may be disposed at the mid-plate.

In various embodiments, the side member 140 may include a metal material.

In the illustrated embodiment, the one or more antenna modules 190 may be disposed adjacent to the side member 140 (e.g., a periphery of the housing 110).

In an embodiment, the antenna module 190 may be disposed adjacent to the side member 140. For example, the antenna module 190 may include a first antenna module 190 disposed adjacent to one of the pair of first portions 140a, a second antenna module 190 disposed adjacent to one of the pair of second portions 140b, and a third antenna module 190 disposed adjacent to the other of the pair of second portions 140b.

In an embodiment, the electronic device 100 may include the plurality of antenna modules 190 disposed within the housing 110, and at least one of the plurality of antenna modules 190 may be disposed adjacent to one edge (e.g., one of the pair of second portions 140b of the side member 140) of the housing 110, and at least another thereof may be disposed adjacent to another edge (e.g., the other of the pair of second portions 140b of the side member 140) facing the one edge.

In the illustrated embodiment, the antenna module 190 may include a first surface 191 facing the second plate 180 (e.g., the second plate 180 of FIG. 3), a second surface (not illustrated) facing the first plate 120 (e.g., the first plate 120 of FIG. 3), and a third surface 193 facing the side member 140 (e.g., an inner surface 1401 of the housing 110).

In the illustrated embodiment, the antenna module 190 may be disposed adjacent to the side member 140 such that the third surface 193 faces the inner surface 1401 of the side member 140. The third surface 193 of the antenna module 190 may include a first radiation region (not illustrated) that is formed to radiate radio waves toward the inner surface 1401 of the side member 140. The first radiation region (not illustrated) may be formed by a conductive pattern on a surface of the antenna module 190 or by a conductive pattern included therein.

In the illustrated embodiment, the first surface 191 of the antenna module 190 may include a second radiation region 1911 that is formed to radiate radio waves toward the second plate 180. The second radiation region 1911 may be formed by a conductive pattern on a surface of the antenna module 190 or by a conductive pattern included therein.

In various embodiments, the second radiation region 1911 may be formed by a conductive pattern having a substantially circular shape.

Referring to FIG. 4, the antenna module 190 may be disposed adjacent to the side member 140 such that a direction (e.g., direction "L" of FIG. 5) in which a plurality of second radiation regions 1911 are arranged is parallel to a lengthwise direction of the side member 140.

For example, the first antenna module 190 adjacent to the first portion 140a may be disposed such that the second radiation regions 1911 are arranged in the x-axis direction. The second antenna module 190 and the third antenna module 190 adjacent to the second portions 140b may be disposed such that the second radiation regions 1911 are arranged in the y-axis direction.

Figure 5:
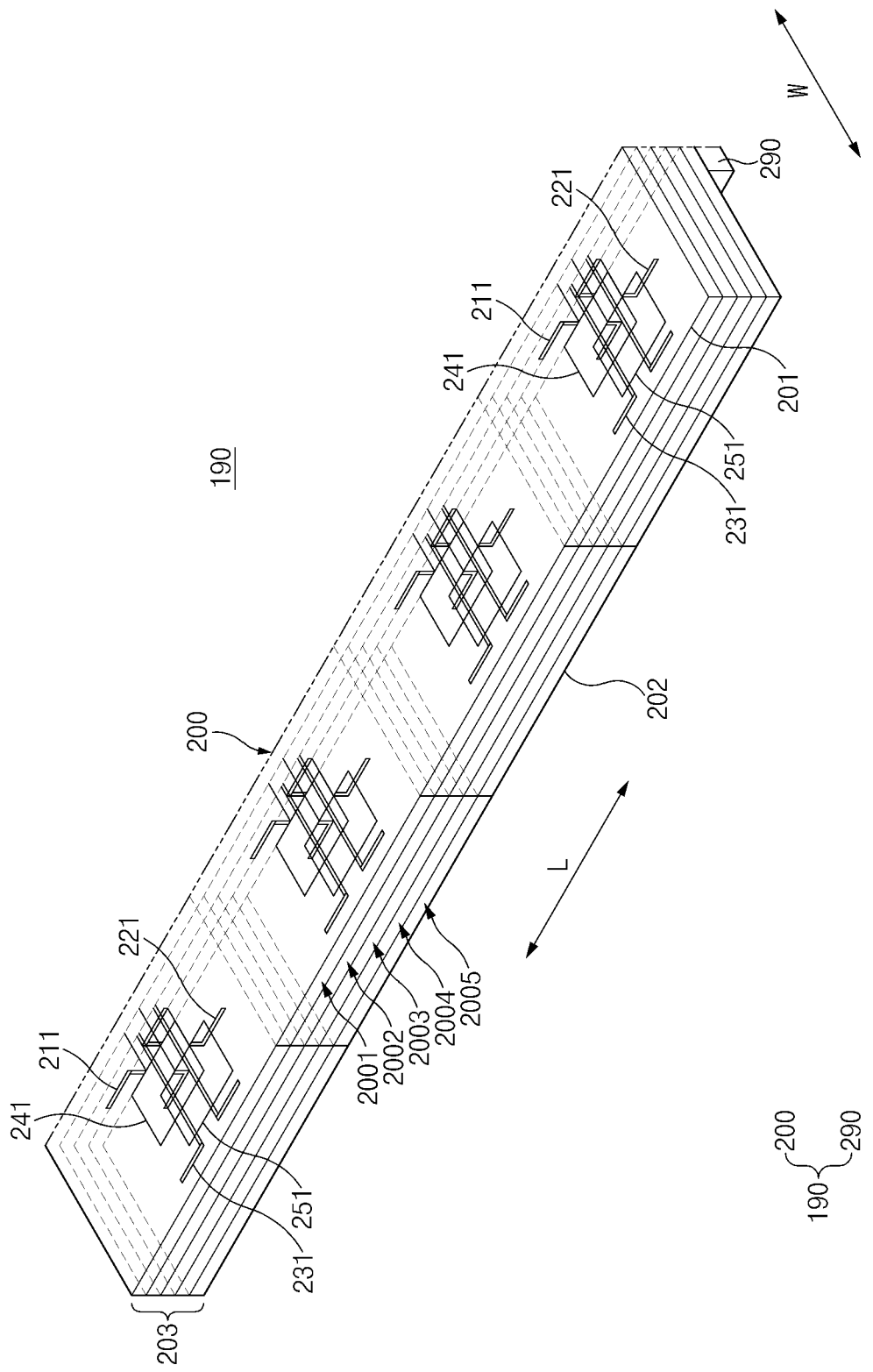
FIG. 5 is a perspective view of a portion of an antenna module of an electronic device, according to an embodiment.

FIG. 5 is a perspective view of a portion of the antenna module 190 of the electronic device 100, according to an embodiment. FIG. 5 is an enlarged perspective view of portions A1, A2, and A3 of FIG. 4.

Figure 6:
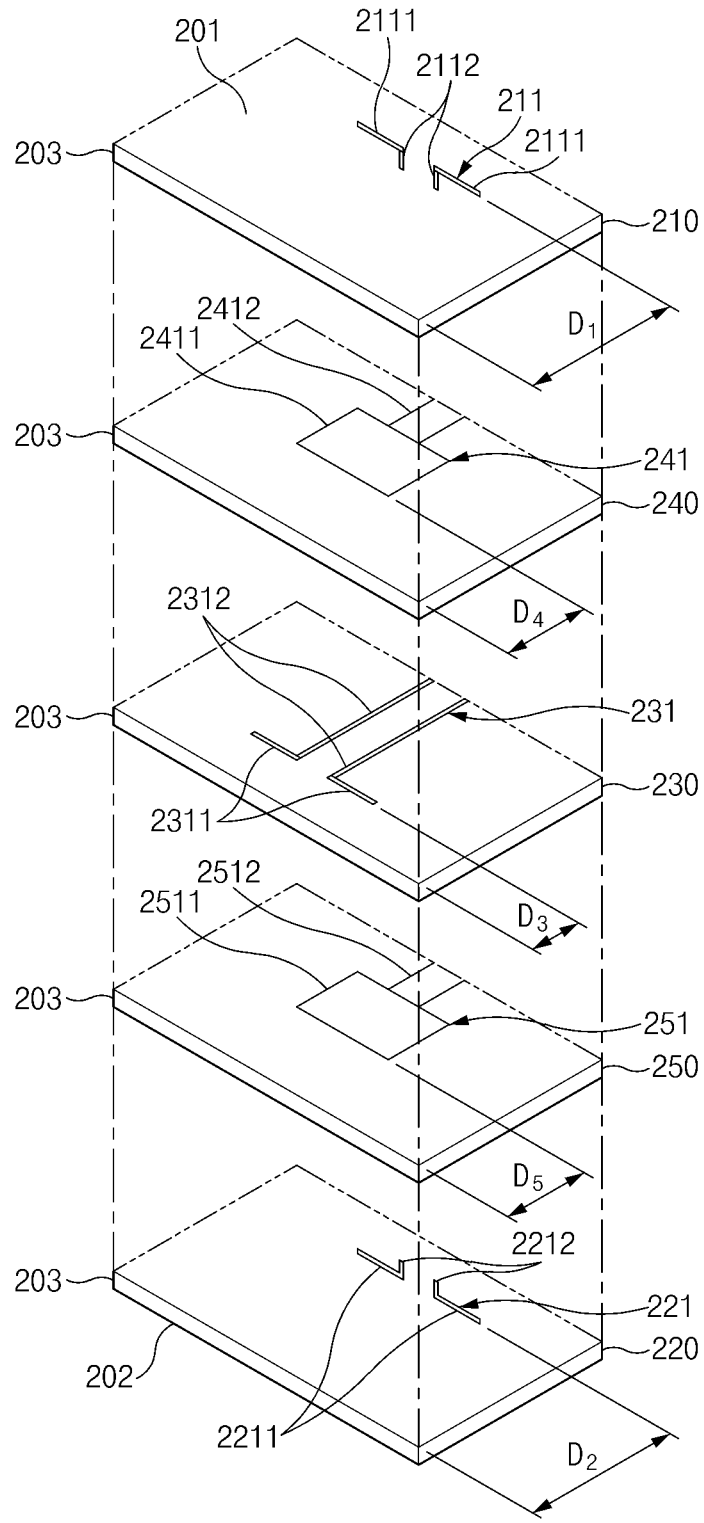
FIG. 6 is an exploded perspective view of an antenna substrate of an electronic device, according to an embodiment.

FIG. 6 is an exploded perspective view of an antenna substrate 200 of the electronic device 100, according to an embodiment. FIG. 6 is a view illustrating a portion of the antenna substrate 200 illustrated in FIG. 5.

Referring to FIG. 5, an antenna module (e.g., the antenna module 190 of FIG. 4) may include the antenna substrate 200, and a wireless communication circuit 290 coupled to the antenna substrate 200.

In an embodiment, the antenna substrate 200 may include a first surface 201 facing a second plate (e.g., the second plate 180 of FIG. 3), a second surface 202 facing a first plate (e.g., the first plate 120 of FIG. 3), a third surface 203 facing the side member 140 (e.g., the inner surface 1401 of the side member 140), and a fourth surface 204 being opposite to the third surface 203. The wireless communication circuit 290 may be disposed on the second surface 202 of the antenna substrate 200. The antenna substrate 200 may be disposed such that the third surface 203 of the antenna substrate 200 faces the outside of the housing 110 and the fourth surface 204 thereof faces an inner space of the housing 110.

Referring to FIGS. 5 and 6, the antenna substrate 200 may have a multi-layer structure. The multi-layer structure may include a first layer 210 including a first antenna 211, a second layer 220 including a second antenna 221, and a third layer 230 disposed between the first layer 210 and the second layer 220 and including a third antenna 231. The third surface 203 and the fourth surface 204 of the antenna substrate 200 may be formed by end surfaces of each of a plurality of layers.

Referring to FIGS. 5 and 6, the first antenna 211 may include a first dipole antenna extended in a second direction (e.g., a direction that the second plate 180 of FIG. 3 faces). The first dipole antenna may be extended in a direction that the first layer 210 faces. That is, the first dipole antenna may be formed to penetrate at least a part of the plurality of layers. For example, the first dipole antenna may be extended toward the first surface 201 from the second surface 202 of the antenna substrate 200. In an embodiment, the first dipole antenna may include a via that penetrates a part of the plurality of layers.

Referring to FIGS. 5 and 6, the second antenna 221 may include a second dipole antenna extended in a first direction (e.g., a direction that the first plate 120 of FIG. 3 faces), which is opposite to the second direction. The second dipole antenna may be extended in a direction that the second layer 220 faces. That is, the second dipole antenna may be formed to penetrate at least a part of the plurality of layers. For example, the second dipole antenna may be extended toward the second surface 202 from the first surface 201 of the antenna substrate 200. In an embodiment, the second dipole antenna may include a via that penetrates a part of the plurality of layers.

Referring to FIGS. 5 and 6, the third antenna 231 may be formed on a surface of a third layer 230. The third antenna 231 may include a third dipole antenna that is extended toward the third surface 203 of the antenna substrate 200 from the fourth surface 204 of the antenna substrate 200. In various embodiments, the third dipole antenna may be extended toward the outside of a housing (e.g., the side member 140 of FIG. 4) from an inner space of the housing (e.g., the side member 140 of FIG. 4). In various embodiments, the third dipole antenna may be extended in a direction that is perpendicular to an edge (e.g., a first portion and a second portion of FIG. 4) of a side member (e.g., the side member 140 of FIG. 4).

In an embodiment, the multi-layer structure may further include a fourth layer 240 formed between the first layer 210 and the third layer 230 and including a fourth patch antenna 241, and a fifth layer 250 formed between the second layer 220 and the third layer 230 and including a fifth patch antenna 251.

Referring to FIGS. 5 and 6, the third antenna 231 (e.g., the third dipole antenna) may be disposed between the fourth patch antenna 241 and the fifth patch antenna 251.

In various embodiments, the antenna module 190 may include an antenna array including the plurality of antennas 211, 221, 231, 241, and 251 arranged in a given number. As output signals of respective antennas are combined, the antenna array may implement a radiation pattern or a radiation coverage, which is incapable of being implemented by a single antenna.

For example, referring to FIG. 5, the antenna module 190 may include a first antenna array 2001 including four first antennas 211, a second antenna array 2002 including four second antennas 221, a third antenna array 2003 including four third antennas 231, a fourth antenna array 2004 including four fourth antennas 241, and a fifth antenna array 2005 including four fifth antennas 251.

In various embodiments, antennas included in each of the antenna arrays 2001, 2002, 2003, 2004, and 2005 may be arranged in a given direction. For example, referring to FIG. 5, each antenna array may be implemented with a 1×4 antenna array including the antennas 211, 221, 231, 241, or 251, which are arranged as much as 4 in direction "L" and as much as 1 in direction "W". However, an antenna array disclosed in the specification is not limited to "1×4", and may include various arrays of antennas (e.g., 2×2).

In various embodiments, the antenna module 190 may include the plurality of antenna arrays 2001, 2002, 2003, 2004, and 2005 stacked. For example, the antenna module 190 illustrated in FIG. 5 may include five 1×4 antenna arrays 2001, 2002, 2003, 2004, and 2005.

An antenna module that includes a general 1×4 antenna array may form a radiation pattern only in direction "W", but the antenna module 190 including the antenna arrays 2001, 2002, 2003, 2004, and 2005 may form a radiation pattern in direction "W" and in a direction (e.g., a direction that the antenna substrate 200 faces) perpendicular to direction "W" and direction "L".

Also, an example in which five 1×4 antenna arrays 2001, 2002, 2003, 2004, and 2005 are stacked is illustrated in FIG. 5, but the antenna module 190 disclosed in the specification may include antenna arrays stacked in various numbers and antenna arrays including antennas variously arranged.

For example, the antenna module 190 may include N W×L antenna arrays.

In an embodiment, an antenna array may be understood as referring to a plurality of antennas formed in one layer, in terms of a structure. For example, the first antenna array 2001 may include the first antennas 211 formed in the first layer 210. The second antenna array 2002 may include the second antennas 221 formed in the second layer 220. The third antenna array 2003 may include the third antennas 231 formed in the third layer 230. The fourth antenna array 2004 may include the fourth antennas 241 formed in the fourth layer 240. The fifth antenna array 2005 may include the fifth antennas 251 formed in the fifth layer 250.

In various embodiments, a feeding signal may be applied to one of the fourth patch antenna 241 and the fifth patch antenna 251, and a ground signal may be applied to the other thereof. For example, the fourth patch antenna 241 and the fifth patch antenna 251 may form a pair of short patches.

In various embodiments, the fourth patch antenna 241 and the fifth patch antenna 251 may electromagnetically interact with the third antenna 231 (e.g., the third dipole antenna). For example, the third dipole antenna may radiate an RF signal in a third direction (e.g., a direction that the side member 140 faces). In the case where the third dipole antenna is extended between the fourth patch antenna 241 and the fifth patch antenna 251, a main radiation direction of the third dipole antenna may be formed in any direction between the third direction and the first direction or in any direction between the third direction and the second direction. The above structure may make it possible to secure a beam coverage in a lateral direction of the third dipole antenna even in the case where the side member 140 is formed of a metal material.

In various embodiments, the fourth patch antenna 241 and the fifth patch antenna 251 may include radiation regions 2411 and 2511 of a specified shape, respectively. For example, the radiation regions 2411 and 2511 are illustrated as regions of a quadrilateral shape, but are not limited thereto. The radiation regions 2411 and 2511 may be formed in various shapes (e.g., a circular shape).

Referring to FIGS. 5 and 6, the first layer 210 may form a surface (e.g., the first surface 201) of the antenna substrate 200, and the second layer 220 may form a surface (e.g., the second surface 202) of the antenna substrate 200, but the disclosure is not limited thereto. For example, the antenna substrate 200 may further include a first surface layer forming a first surface of the antenna substrate 200 and a second surface layer forming a second surface of the antenna substrate 200, and the first layer 210, the second layer 220, and the third layer 230 may be inner layers disposed between the first surface layer and the second surface layer.

That is, the first antenna 211 and the second antenna 221 disclosed in the specification are not limited to an example in which they are exposed to a surface of the antenna substrate 200 and may be formed within the antenna substrate 200.

In an embodiment, the wireless communication circuit 290 may be electrically connected with each of the plurality of antennas 211, 221, 231, 241, and 251 included in the antenna substrate 200. The wireless communication circuit 290 may be configured to apply feeding signals to the plurality of antennas 211, 221, 231, 241, and 251, respectively. In various embodiments, the wireless communication circuit 290 may be configured to change (or shift) phases of the feeding signals.

In an embodiment, the antenna substrate 200 may include conductive layers and an insulating layer disposed between the conductive layers, and the first to fifth antennas 211, 221, 231, 241, and 251 may be formed by conductive patterns formed in the conductive layers.

In various embodiments, the first antenna 211, the second antenna 221, and the third antenna 231 may include a patch antenna facing a direction that each layer faces, and/or a dipole antenna extended in the direction that each layer faces.

In the illustrated embodiment, respective patch antennas (e.g., the fourth patch antenna 241 and the fifth patch antenna 251) may include the radiation regions 2411 and 2511 from which RF signals are radiated, and conductive lines 2412 and 2512 through which electrical signals applied to the radiation regions 2411 and 2511 flow. The electrical signal may be a feeding signal or a ground signal.

In the illustrated embodiment, respective dipole antennas (e.g., the first antenna 211, the second antenna 221, and the third antenna 231) may include conductive lines 2112, 2212, and 2312 through which feeding signals flow, and conductive radiators 2111, 2211, and 2311 extended substantially vertically from the conductive lines 2112, 2212, and 2312.

In the illustrated embodiment, the first antenna 211 may be formed such that the conductive line 2112 penetrates the first layer 210 and the conductive radiator 2111 is extended on a surface of the first layer 210. The second antenna 221 may be formed such that the conductive line 2212 penetrates the second layer 220 and the conductive radiator 2211 is extended on a surface of the second layer 220. In the third antenna 231, the conductive line 2312 and the conductive radiator 2311 may be formed on a surface of the third layer 230. In this case, the conductive line 2312 of the third antenna 231 may be extended toward the third surface 203 from the fourth surface 204.

In an embodiment, the first antenna 211 may be formed at a location spaced from the third surface 203 of the antenna substrate 200 as much as a first distance $D_1$. The second antenna 221 may be formed at a location spaced from the third surface 203 of the antenna substrate 200 as much as a second distance $D_2$. The third antenna 231 may be formed at a location spaced from the third surface 203 of the antenna substrate 200 as much as a third distance $D_3$.

In various embodiments, the first surface 201 of the antenna substrate 200 may face the second direction (e.g., a direction that the second plate 180 of FIG. 3 faces), and the second surface 202 may face the first direction (e.g., a direction that the first plate 120 of FIG. 3 faces). In this case, the third surface 203 may face the third direction, which is perpendicular to the first direction and the second direction. In this case, in various embodiments, each of the first distance $D_1$, the second distance $D_2$, and the third distance $D_3$ may be a distance measured along the third direction from the third surface 203 of the antenna substrate 200. Also, the first distance $D_1$, the second distance $D_2$, and the third distance $D_3$ may be distances measured along a surface of a layer in which an antenna is formed.

In various embodiments, the conductive radiator 2311 of the third antenna 231 (e.g., the third dipole antenna) may be formed adjacent to the third surface 203 of the antenna substrate 200 compared to the conductive radiator 2111 of the first antenna 211 (e.g., the first dipole antenna) and the conductive radiator 2211 of the second antenna 221 (e.g., the second dipole antenna).

In various embodiments, the antenna substrate 200 may be formed such that the third antenna 231 is more adjacent to the third surface 203 than the first antenna 211 and the second antenna 221. For example, the third distance $D_3$ may be formed to be larger than the first distance $D_1$ and the second distance $D_2$. For example, the first distance $D_1$ and the second distance $D_2$ may be substantially equal.

In an embodiment, the fourth patch antenna 241 may include a fourth ground region (not illustrated) that is formed between the third layer 230 and the fourth layer 240, and the fifth patch antenna 251 may include a fifth ground region (not illustrated) that is formed between the third layer 230 and the fifth layer 250. In this case, the fourth patch antenna 241 may be formed to radiate an RF signal in the second direction (e.g., a direction that the second plate 180 of FIG. 3 faces), and the fifth patch antenna 251 may be formed to radiate an RF signal in the first direction (e.g., a direction that the first plate 120 of FIG. 3 faces).

In various embodiments, the fourth patch antenna may be formed at a location spaced from the third surface 203 of the antenna substrate 200 as much as a fourth distance $D_4$. In various embodiments, the fifth patch antenna may be formed at a location spaced from the third surface 203 of the antenna substrate 200 as much as a fifth distance $D_5$. The fourth distance $D_4$ and the fifth distance $D_5$ may be distances measured along the third direction from the third surface 203 of the antenna substrate 200.

In various embodiments, the fourth distance $D_4$ may be formed to be smaller than the first distance $D_1$ and to be longer than the third distance $D_3$. The fifth distance $D_5$ may be formed to be smaller than the second distance $D_2$ and to be longer than the third distance $D_3$. The fourth distance $D_4$ and the fifth distance $D_5$ may be substantially equal.

In various embodiments, the fourth patch antenna 241 may be partially aligned with the first antenna 211, when viewed from above the first surface 201 of the antenna substrate 200. That is, the conductive line 2112 of the first antenna 211 may be formed in a region corresponding to the radiation region 2411 of the fourth patch antenna 241.

In various embodiments, the fifth patch antenna 251 may be partially aligned with the second antenna 221, when viewed from above the second surface 202 of the antenna substrate 200. That is, the conductive line 2212 of the second antenna 221 may be formed in a region corresponding to the radiation region 2511 of the fifth patch antenna 251.

In various embodiments, in the case where the third antenna 231 is implemented with the third dipole antenna, the fourth patch antenna 241 and the fifth patch antenna 251 may be implemented with a pair of patch antennas (e.g., a pair of short patches). In this case, a feeding signal may be applied to the fourth patch antenna 241, and a ground signal may be applied to the fifth patch antenna 251.

In various embodiments, in the case where the first antenna 211, the second antenna 221, and the third antenna 231 are respectively implemented with a first patch antenna, a second patch antenna, and a third patch antenna, the fourth patch antenna 241 and the fifth patch antenna 251 may be omitted.

In various embodiments, in the case where the first antenna 211 and the second antenna 221 are respectively implemented with the first dipole antenna and the second dipole antenna, a potential difference that is formed with respect to a ground region may enable the radiation of RF signals in the second direction (e.g., a direction that the second plate 180 of FIG. 3 faces) and the first direction (e.g., a direction that the first plate 120 of FIG. 3 faces) with a patch antenna.

Figure 7:
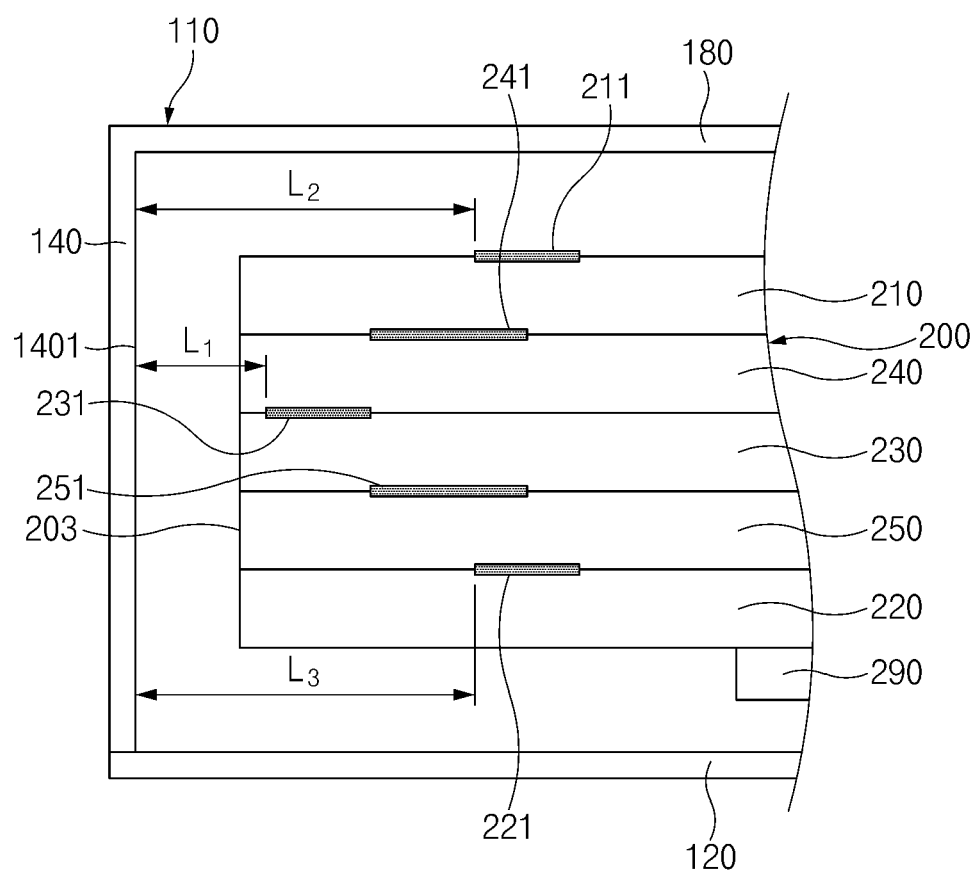
FIG. 7 is a cross-sectional view of an electronic device in which an antenna module is disposed, according to an embodiment.

FIG. 7 is a cross-sectional view of the electronic device 100 in which the antenna module 190 is disposed, according to an embodiment.

Referring to FIG. 7, the electronic device 100 may include the housing 110, and the antenna module 190 disposed within the housing 110. The housing 110 may include the first plate 120, the second plate 180, and the side member 140 surrounding an inner space between the first plate 120 and the second plate 180. The antenna module 190 may be disposed in the inner space.

The antenna module 190 may include the antenna substrate 200 that includes the first surface 201 facing the second plate 180 (e.g., the second direction), the second surface 202 facing the first plate 120 (e.g., the first direction), and the third surface 203 facing the inner surface 1401 of the side member 140 (e.g., the third direction), and the wireless communication circuit 290 disposed on the second surface 202 of the antenna substrate 200.

In various embodiments, the antenna substrate 200 may include the first antenna 211 adjacent to the first surface 201; the second antenna 221 adjacent to the second surface 202; the third antenna 231, the fourth patch antenna 241, and the fifth patch antenna 251 formed between the first surface 201 and the second surface 202.

Each of the first to fifth antennas 211, 221, 231, 241, and 251 may include a dipole antenna that is extended in a given direction (e.g., an extending direction of a conductive line), or a patch antenna that faces a given direction (e.g., a direction that a radiation region faces).

For example, the first antenna 211 may include a first patch antenna in which a radiation region faces the second plate 180 or a first dipole antenna in which a conductive line (e.g., 2112) is extended in a direction facing the second plate 180.

For example, the second antenna 221 may include a second patch antenna in which a radiation region faces the first plate 120 or a second dipole antenna in which a conductive line (e.g., 2212) is extended in a direction facing the first plate 120.

For example, the third antenna 231 may include a third patch antenna in which a radiation region faces the second plate 180 or the first plate 120 or a third dipole antenna in which a conductive line (e.g., 2312) is extended in a direction facing the inner surface 1401 of the side member 140.

In various embodiments, the fourth patch antenna 241 may be formed in a region corresponding to at least a portion (e.g., the conductive line 2112) of the first antenna 211, when viewed from above the first surface 201 of the antenna substrate 200. The fifth patch antenna 251 may be formed in a region corresponding to at least a portion (e.g., the conductive line 2212) of the second antenna 221, when viewed from above the first surface 201 of the antenna substrate 200.

In the illustrated embodiment, the antenna substrate 200 may be formed such that the first antenna 211 is spaced from the inner surface 1401 of the side member 140 as much as a first length $L_1$, the second antenna 221 is spaced from the inner surface 1401 of the side member 140 as much as a second length $L_2$, and the third antenna 231 is spaced from the inner surface 1401 of the side member 140 as much as a third length $L_3$. In this case, the first length $L_1$, the second length $L_2$, and the third length $L_3$ may be lengths measured in a direction perpendicular to a direction that each of the first surface 201 and the second surface 202 of the antenna substrate 200 faces. Here, the third length $L_3$ may be smaller than the first length $L_1$ and the second length $L_2$. The first length $L_1$ and the second length $L_2$ may be substantially equal.

In an embodiment, the side member 140 may include a metal material. The first plate 120 and the second plate 180 may be formed of a non-conductive material. An RF signal that is radiated in a lateral direction of an electronic device may be absorbed or reflected by the metal material contained in the side member 140.

Accordingly, the wireless communication circuit 290 may respectively apply feeding signals to the plurality of antennas 211, 221, 231, 241, and 251 such that at least two of the plurality of antennas 211, 221, 231, 241, and 251 form a beam together. For example, the wireless communication circuit 290 may respectively apply feeding signals to the plurality of antennas 211, 221, 231, 241, and 251 such that RF signals radiated by the antennas 211, 221, 231, 241, and 251 are not blocked by the inner surface 1401 of the side member 140 and such that at least a portion of the beam coverage is extended in the lateral direction through the first plate 120 or the second plate 180.

In an embodiment, the third antenna 231 may be implemented with the third dipole antenna in which the feeding line 2312 is extended in a direction (e.g., the third direction) facing the inner surface 1401 of the side member 140. In this case, the wireless communication circuit 290 may feed the fourth patch antenna 241 or the fifth patch antenna 251 such that a main radiation direction of the third dipole antenna forms a given angle with respect to the third direction. For example, as a feeding signal is applied to one of the fourth patch antenna 241 and the fifth patch antenna 251 and a ground signal is applied to the other thereof, an electric field may be formed between the fourth patch antenna 241 and the fifth patch antenna 251. In this case, the main radiation direction of the third dipole antenna that is extended between the fourth patch antenna 241 and the fifth patch antenna 251 may be changed by the electric field.

The electrical connection between the antennas 211, 221, 231, 241, and 251 and the wireless communication circuit 290 is illustrated in FIG. 7, but the antennas 211, 221, 231, 241, and 251 may be electrically connected with the wireless communication circuit 290 through conductive lines (not illustrated) that are formed within the antenna substrate 200 and/or on the surface of the antenna substrate 200. The conductive lines may include various ways, structures, and shapes.

Figure 8:
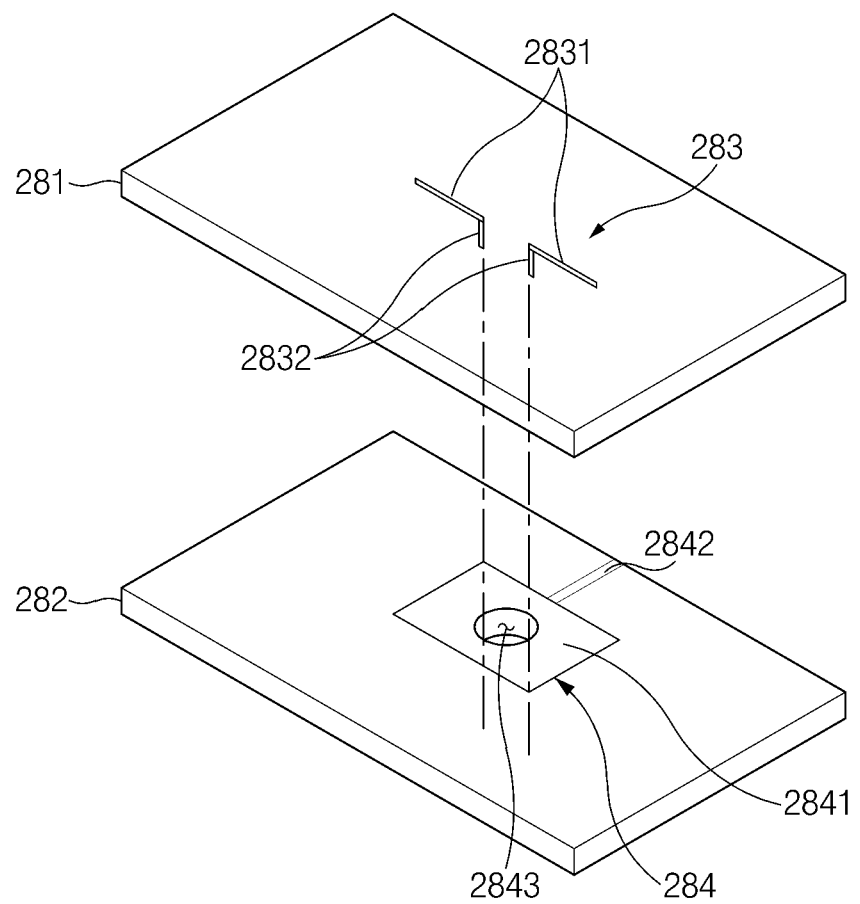
FIG. 8 is a view illustrating a portion of a stacked structure of an antenna substrate of an electronic device, according to various embodiments.
Figure 9:
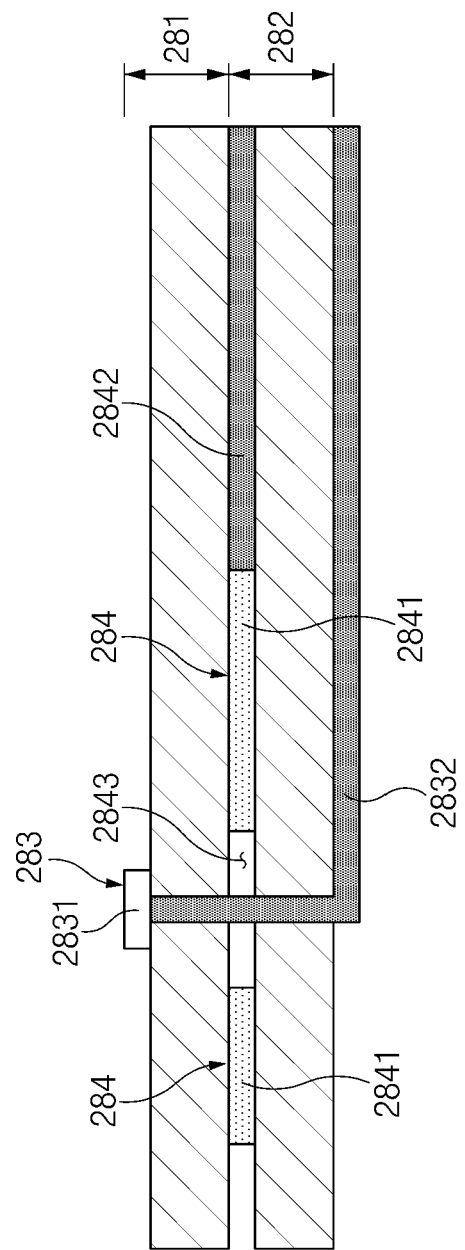
FIG. 9 is a cross-sectional view of an antenna substrate illustrated in FIG. 8.

FIG. 8 is a view illustrating a portion of a stacked structure of an antenna substrate 280 of the electronic device 100, according to various embodiments. FIG. 9 is a cross-sectional view of the antenna substrate 280 illustrated in FIG. 8.

A dipole antenna 283 to be described here may be referenced as the first antenna 211 and/or the second antenna 221 illustrated in FIGS. 5 and 6, and a patch antenna 284 may be referenced as the fourth patch antenna 241 and/or the fifth patch antenna 251 illustrated in FIGS. 5 and 6.

Here, a first layer 281 to be described here may be referenced as the first layer 210 and/or the second layer 220 illustrated in FIGS. 5 and 6, and a second layer 282 may be referenced as the fourth layer 240 and/or the fifth layer 250 illustrated in FIGS. 5 and 6.

Referring to FIGS. 8 and 9, the antenna substrate 280 may include the first layer 281 in which the dipole antenna 283 is formed, and the second layer 282 in which the patch antenna 284 is formed.

In the illustrated embodiment, the dipole antenna 283 may include conductive lines 2832 extended in a direction penetrating the first layer 281 and conductive radiators 2831 formed on a surface of the first layer 281. The conductive lines 2832 and the conductive radiators 2831 may be extended in substantially vertical directions.

A feeding signal may be applied to one of the conductive lines 2832, and a ground signal may be applied to the other thereof. As such, the conductive radiators 2831 may radiate an RF signal.

In the illustrated embodiment, the patch antenna 284 may include a radiation region 2841 formed on a surface of the second layer 282 and a conductive line 2842 extended along the surface of the second layer 282. The conductive line 2842 may be a conductive pattern extended substantially from the radiation region 2841.

In the illustrated embodiment, an opening 2843 may be formed in the second layer 282 and the radiation region 2841 of the patch antenna 284. In this case, the opening 2843 may be formed at a location corresponding to the conductive lines 2832 of the dipole antenna 283 formed in the first layer 281. Referring to FIG. 9, a portion of the conductive line 2832 of the dipole antenna 283 may be inserted into the opening 2843.

In various embodiments, the dipole antenna 283 may radiate an RF signal in an extending direction of the conductive line 2832. The dipole antenna 283 illustrated in FIGS. 8 and 9 may radiate an RF signal in a direction, which the first layer 281 faces, from the second layer 282.

As described with reference to FIGS. 4 to 7, the patch antenna 284 may be formed in pair. In this case, a feeding signals and a ground signal may be respectively applied to a pair of patch antennas (e.g., the fourth patch antenna 241 and the fifth patch antenna 251), an electric field may be formed between the paired patch antennas (e.g., the fourth patch antenna 241 and the fifth patch antenna 251), and a radiation direction of a dipole antenna (e.g., the third antenna 231) extended between the paired patch antennas (e.g., the fourth patch antenna 241 and the fifth patch antenna 251) may be changed by the electric field.

In various embodiments, a characteristic of the patch antenna 284 may be determined by a length of an edge rather than a width of the radiation region 2841. That is, even though the opening 2843 is formed at a portion of the radiation region 2841, a characteristic of an electric field that is formed between a pair of patch antennas 284 may be maintained.

Accordingly, the patch antenna 284 illustrated in FIGS. 8 and 9 may be referenced as illustrating one of a pair of patch antennas (e.g., the fourth patch antenna 241 and the fifth patch antenna 251) forming an electric field like the above embodiments.

However, the disclosure is not limited thereto. For example, the patch antenna 284 illustrated may be formed to radiate an RF signal solely. For example, a ground region (not illustrated) corresponding to the radiation region 2841 may be formed under the patch antenna 284. As such, when a feeding signal is applied to the radiation region 2841, the patch antenna 284 may radiate an RF signal by a potential difference of the radiation region 2841 and the ground region (not illustrated).

In various embodiments, the antenna substrate 280 may include a stacked structure that includes the dipole antenna 283, the patch antenna 284 partially aligned with the dipole antenna 283, and the opening 2843 formed at the patch antenna 284 such that a portion of the dipole antenna 283 is capable of being inserted therein.

In various embodiments, the conductive lines 2832 of the dipole antenna 283 may include a strip line or a microstrip line implemented (e.g., printed) at a printed circuit board PCB. Also, a portion of the conductive lines 2832 of the dipole antenna 283 may be implemented through a via process of the printed circuit board PCB.

In various embodiments, the conductive line 2842 of the patch antenna 284 may include a strip line or a microstrip line implemented (e.g., printed) on a printed circuit board PCB.

In various embodiments, the conductive lines 2832 and 2842 may be electrically connected with an RFIC. The conductive lines 2832 and 2842 may be electrically connected with the RFIC in various feeding manners. For example, the conductive lines 2832 and 2842 may include Probe Fed, Strip Line Fed, or Pin Fed.

As the patch antenna 284 and the dipole antenna 283 are stacked, the stacked structure may provide advantages: the reduction in the area of the antenna substrate 200 and a minimum influence on radiation characteristics of the antennas 283 and 284.

Figure 10:
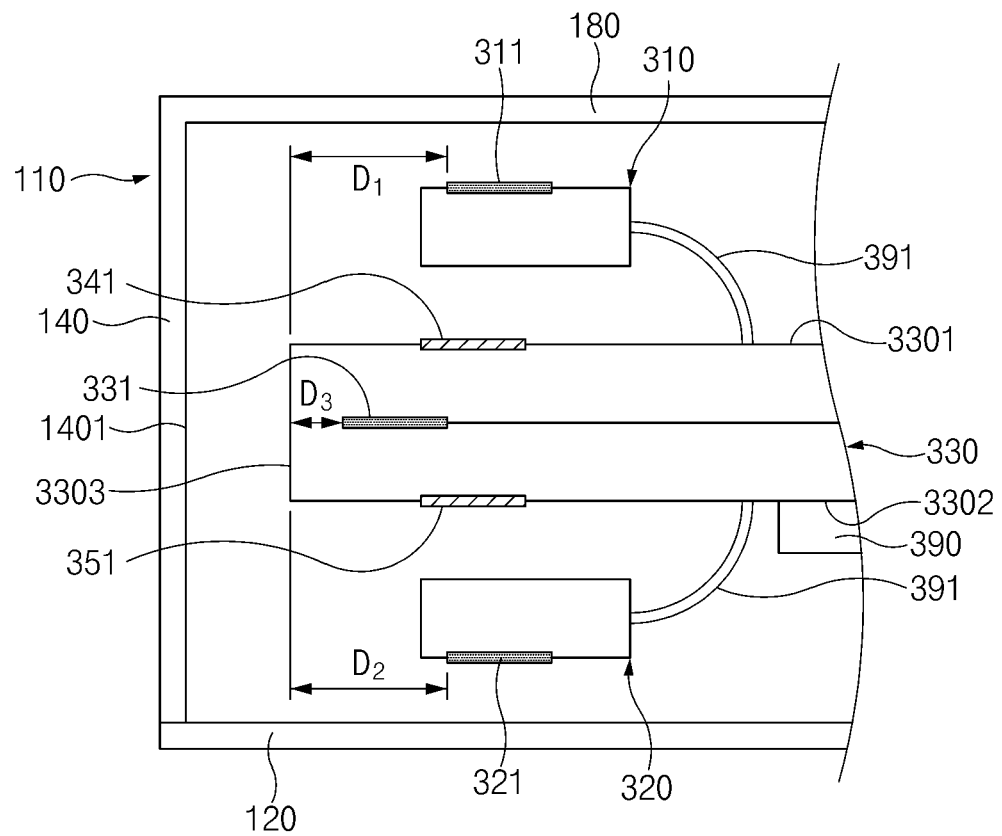
FIG. 10 is a cross-sectional view of an electronic device in which an antenna module is disposed, according to various embodiments.

FIG. 10 is a cross-sectional view of the electronic device 100 in which the antenna module 190 is disposed, according to various embodiments.

The electronic device 100 may include the housing 110; a first antenna substrate 310, a second antenna substrate 320, and a third antenna substrate 330 disposed within the housing 110.

In the illustrated embodiment, the housing 110 may include the first plate 120 facing the first direction, the second plate 180 facing the second direction opposite to the first direction, and the side member 140 surrounding a space between the first plate 120 and the second plate 180.

In the illustrated embodiment, the antenna substrates 310, 320, and 330 may be disposed in an inner space of the housing 110. The antenna substrates 310, 320, and 330 may include the first antenna substrate 310 disposed adjacent to the second plate 180, the second antenna substrate 320 disposed adjacent to the first plate 120, and the third antenna substrate 330 disposed between the first antenna substrate 310 and the second antenna substrate 320.

Here, the first antenna substrate 310 may be referenced as the first layer 210 illustrated in FIGS. 5 and 6, the second antenna substrate 320 may be referenced as the second layer 220 illustrated in FIGS. 5 and 6, and the third antenna substrate 330 may be referenced as the third layer 230, the fourth layer 240, and the fifth layer 250 illustrated in FIGS. 5 and 6.

In the illustrated embodiment, the first antenna substrate 310 may include a first antenna 311. The first antenna 311 may include a first dipole antenna extended in the second direction (e.g., a direction that the second plate 180 of FIG. 3 faces) or a first patch antenna facing the second direction. The first antenna 311 may be formed on a surface of the first antenna substrate 310, which faces the second plate 180.

In the illustrated embodiment, the second antenna substrate 320 may include a second antenna 321. The second antenna 321 may include a second dipole antenna extended in the first direction (e.g., a direction that the first plate 120 of FIG. 3 faces) or a second patch antenna facing the first direction. The second antenna 321 may be formed on a surface of the second antenna substrate 320, which faces the first plate 120.

In the illustrated embodiment, the third antenna substrate 330 may include a first surface 3301 facing the second plate 180, a second surface 3302 facing the first plate 120, and a third surface 3303 formed between the first surface 3301 and the second surface 3302. The third surface 3303 may substantially face the inner surface 1401 of the side member 140.

In the illustrated embodiment, the third antenna substrate 330 may include a fourth patch antenna 341 formed on the first surface 3301 or formed adjacent to the first surface 3301, a fifth patch antenna 351 formed on the second surface 3302 or formed adjacent to the second surface 3302, and a third antenna 331 formed between the fourth patch antenna 341 and the fifth patch antenna 351.

In the illustrated embodiment, the third antenna 331 may include a third dipole antenna facing the third direction perpendicular to the first direction and the second direction or a third patch antenna facing the third direction.

In various embodiments, the electronic device 100 may include a wireless communication circuit 390 that are electrically connected with the first to fifth antennas 311, 321, 331, 341, and 351. In an embodiment, the wireless communication circuit 390 may be disposed on the second surface 3302 of the third antenna substrate 330.

In various embodiments, the first antenna substrate 310, the second antenna substrate 320, and the third antenna substrate 330 may be formed such that the first antenna 311 is spaced from the third surface 3303 of the third antenna substrate 330 as much as the first distance $D_1$, the second antenna 321 is spaced from the third surface 3303 of the third antenna substrate 330 as much as the second distance $D_2$, the third antenna 331 is spaced from the third surface 3303 of the third antenna substrate 330 as much as the third distance $D_3$, and the third distance $D_3$ is smaller than the first distance $D_1$ and the second distance $D_2$.

In various embodiments, in the case where the third antenna 331 is implemented with the third dipole antenna, the fourth patch antenna 341 and the fifth patch antenna 351 may be implemented with a pair of patch antennas (e.g., a pair of short patches). In this case, a feeding signal may be applied to the fourth patch antenna 341, and a ground signal may be applied to the fifth patch antenna 351.

In an embodiment, the first antenna 311 may be implemented with a first patch antenna facing the second direction. The second antenna 321 may be implemented with a second patch antenna facing the first direction opposite to the second direction. The third antenna 331 may be implemented with a third dipole antenna extended in the third direction perpendicular to the first direction and the second direction. In this case, a fourth dipole antenna may be formed between the first patch antenna and the third dipole antenna. A fifth dipole antenna may be formed between the second patch antenna and the third dipole antenna.

For example, the fourth dipole antenna may be extended in a direction (e.g., the second direction), which is parallel to the third dipole antenna or is perpendicular to an extending direction of the third dipole antenna. The fifth dipole antenna may be extended in a direction (e.g., the first direction), which is parallel to the third dipole antenna or is perpendicular to an extending direction of the third dipole antenna.

In various embodiments, in the case where the first antenna 311, the second antenna 321, and the third antenna 331 are respectively implemented with the first patch antenna, the second patch antenna, and the third patch antenna, the fourth patch antenna 341 and the fifth patch antenna 351 may be omitted.

In various embodiments, in the case where the first antenna 311 and the second antenna 321 are respectively implemented with the first dipole antenna and the second dipole antenna, the fourth patch antenna 341 and the fifth patch antenna 351 may be implemented with patch antennas such that a potential difference formed with respect to a ground region enables the radiation of RF signals in the second direction and the first direction.

In various embodiments, the antenna module 190 may include a connection member 391 for electrically connecting the first antenna substrate 310, the second antenna substrate 320, and the third antenna substrate 330. For example, the connection member 391 may be formed to electrically connect any other antenna substrates (e.g., the first antenna substrate 310 and the second antenna substrate 320) with an antenna substrate (e.g., the third antenna substrate 330) where the wireless communication circuit 390 is disposed. For example, the connection member 391 may include a coaxial cable or an FPCB.

The electrical connection between the antennas 311, 321, 331, 341, and 351 and the wireless communication circuit 390 is illustrated in FIG. 10, but the antennas 311, 321, 331, 341, and 351 may be electrically connected with a wireless communication circuit (e.g., an RFIC) through conductive lines (not illustrated) that are formed within the antenna substrates 310, 320, and 330 and/or on the surfaces thereof. The conductive lines may include various ways, structures, and shapes.

For example, the first antenna 311 may be electrically connected with the wireless communication circuit 390 through the electrical connection with the connection member 391 through a conductive line (not illustrated) formed within the first antenna substrate 310 or on a surface thereof.

For example, the second antenna 321 may be electrically connected with the wireless communication circuit 390, through the electrical connection with the connection member 391 using a conductive line (not illustrated) formed within the second antenna substrate 320 or on a surface thereof.

Figure 11:
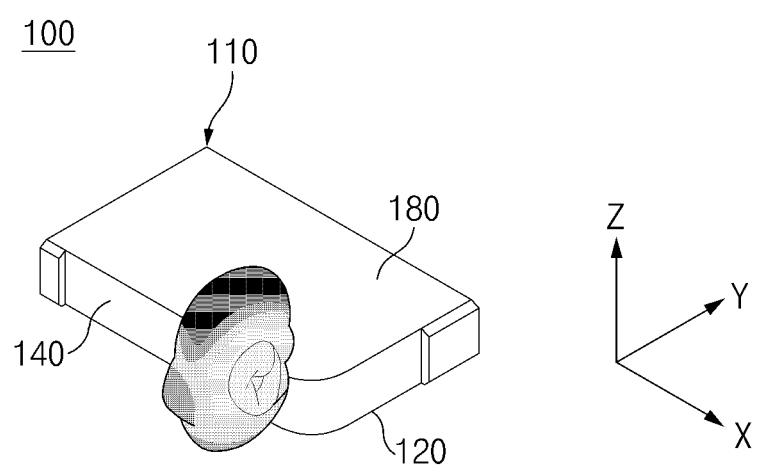
FIG. 11 is a diagram illustrating a radiation pattern when feeding signals of the same phase are respectively supplied to antennas included in an antenna substrate illustrated in FIG. 6.

FIG. 11 is a diagram illustrating a radiation pattern when feeding signals of the same phase are respectively supplied to the antennas 211, 221, 231, 241, and 251 included in the antenna substrate 200 illustrated in FIG. 6.

In the illustrated embodiment, the housing 110 may include the first plate 120 forming a front surface of the electronic device 100, the second plate 180 forming a rear surface of the electronic device 100, and the side member 140 connecting the first plate 120 and the second plate 180. In this case, the antennas 211, 221, 231, 241, and 251 illustrated in FIG. 6 may be disposed within the housing 110 of the electronic device 100.

The first antenna 211 may be implemented with a first dipole antenna extended toward the second plate 180. The second antenna 221 may be implemented with a second dipole antenna extended toward the first plate 120. The third antenna 231 may be implemented with a third dipole antenna extended toward the side member 140. The fourth patch antenna 241 facing the second plate 180 may be disposed between the first antenna 211 and the third antenna 231. The fifth patch antenna 251 facing the first plate 120 may be disposed between the second antenna 221 and the third antenna 231.

In the illustrated embodiment, each of the first plate 120 and the second plate 180 may be formed of a non-conductive material, and the side member 140 may include a metal material.

In the illustrated embodiment, when feeding signals of the same phase are applied to the antennas 211, 221, 231, 241, and 251, a radiation pattern of an output signal passing through the first plate 120 and the second plate 180, which are formed of a non-conductive material, may be formed to be relatively larger than that of an output signal passing through the side member 140 formed of a metal material. This may be understood as the electronic device 100 has a higher radiation efficiency in a forward direction thereof (e.g., in a −z-axis direction) and a rearward direction thereof (e.g., in a +z-axis direction) than that in a lateral direction thereof (e.g., in a −y-axis direction).

Figure 12A:
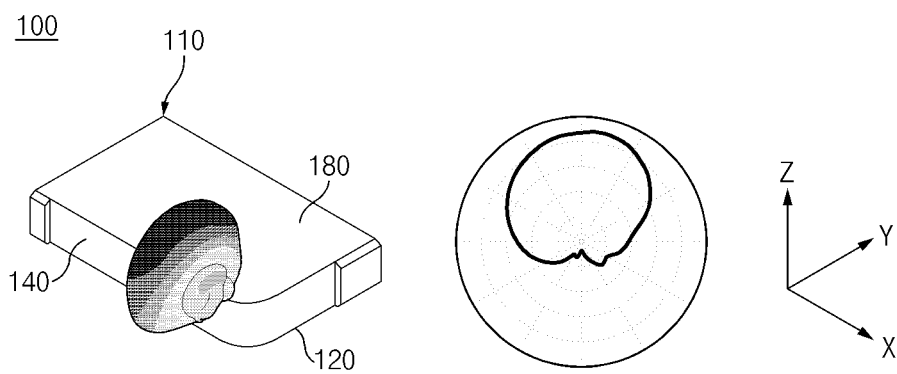
FIGS. 12A to 12C are diagrams illustrating radiation patterns when one of a first antenna to a third antenna included in an antenna substrate illustrated in FIG. 6 is fed.
Figure 12B:
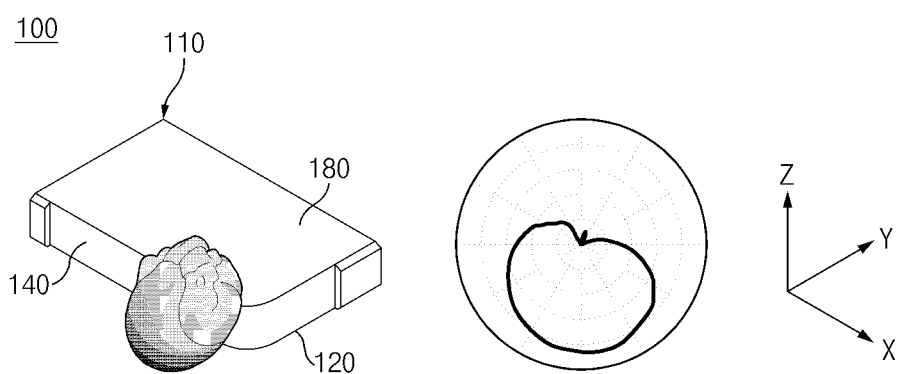
Figure 12C:
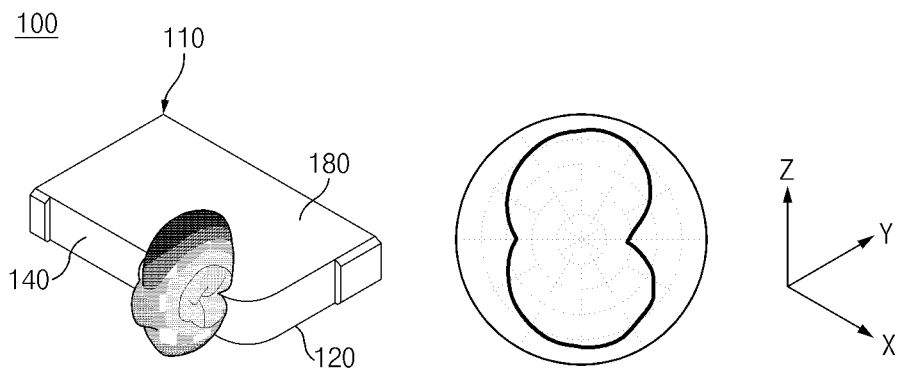

FIGS. 12A to 12C are diagrams illustrating radiation patterns when one of the first to third antennas 211, 221, and 231 included in the antenna substrate 200 illustrated in FIG. 6 is fed.

FIGS. 13A to 13D are diagrams illustrating radiation patterns when at least two of the first to third antennas 211, 221, and 231 included in the antenna substrate 200 illustrated in FIG. 6 are fed.

In the illustrated embodiment, the housing 110 may include the first plate 120 forming the front surface of the electronic device 100, the second plate 180 forming the rear surface of the electronic device 100, and the side member 140 connecting the first plate 120 and the second plate 180. In this case, each of the first plate 120 and the second plate 180 may be formed of a non-conductive material, and the side member 140 may include a metal material.

In the illustrated embodiment, FIG. 12A shows a radiation pattern in the case where a feeding signal is applied only to the first antenna 211. Referring to FIG. 12A, as the feeding signal is applied to the first antenna 211, an output signal may pass through the first plate 120. Because the first plate 120 is formed of a non-conductive material, the loss of the output signal that is radiated from the first antenna 211 may be small.

FIG. 12B shows a radiation pattern in the case where a feeding signal is applied only to the second antenna 221. Referring to FIG. 12B, as the feeding signal is applied to the second antenna 221, an output signal may pass through the second plate 180. Because the second plate 180 is formed of a non-conductive material, the loss of the output signal that is radiated from the second antenna 221 may be small.

Comparing FIG. 12A and FIG. 12B, the radiation pattern that is formed by the second antenna 221 may have a relatively wide radiation coverage compared to the radiation pattern that is formed by the first antenna 211. In an embodiment, a display (e.g., the display 130 of FIG. 3) may be disposed between the first antenna 211 and the first plate 120, and the display may include a metal layer. As such, the first antenna 211 may have a relatively narrow radiation coverage compared to the second antenna 221.

In the illustrated embodiment, FIG. 12C shows a radiation pattern in the case where a feeding signal is applied only to the third antenna 231. Referring to FIG. 12C, a radiation coverage may not be sufficiently formed in a lateral direction of the electronic device 100 (e.g., in the −y-axis direction). This may be understood as a signal radiated from the third antenna 231 is absorbed or reflected by a metal material contained in the side member 140.

Accordingly, in the case where only the third antenna 231 operates, there may be an issue that a radiation coverage is not sufficiently secured in the lateral direction of the electronic device 100 (e.g., in the −y-axis direction).

Below, a part of embodiments disclosed in FIGS. 13A to 13D may secure a radiation coverage in the lateral direction (e.g., the −y-axis direction) by combing at least two of the first antenna 211, the second antenna 221, and the third antenna 231.

Figure 13A:
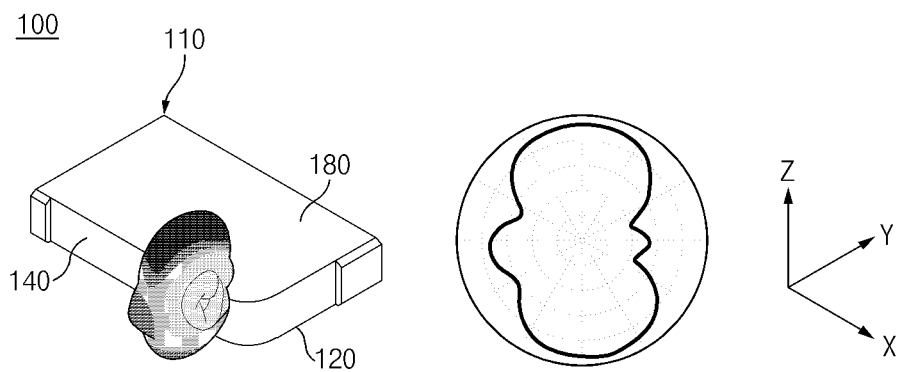
FIGS. 13A to 13D are diagrams illustrating radiation patterns when at least two of a first antenna to a third antenna included in an antenna substrate illustrated in FIG. 6 are fed.

FIG. 13A shows a radiation pattern in the case where feeding signals of the same phase are applied to the first antenna 211 and the second antenna 221.

As illustrated in FIG. 13A, even though the third antenna 231 is not fed, a radiation coverage may be formed in the lateral direction of the electronic device 100 (e.g., in the −y-axis direction). The radiation coverage may be understood as being formed by the interaction of the radiation pattern (e.g., the radiation pattern illustrated in FIG. 12A) that the first antenna 211 forms and the radiation pattern (e.g., the radiation pattern illustrated in FIG. 12B) that the second antenna 221 forms.

In various embodiments, a wireless communication circuit (e.g., the wireless communication circuit 290 of FIG. 5) may form a radiation coverage extended in the lateral direction of the electronic device 100 (e.g., the −y-axis direction) through the first plate 120 and the second plate 180, by applying feeding signals of the same phase to the first antenna 211 and the second antenna 221.

Figure 13B:
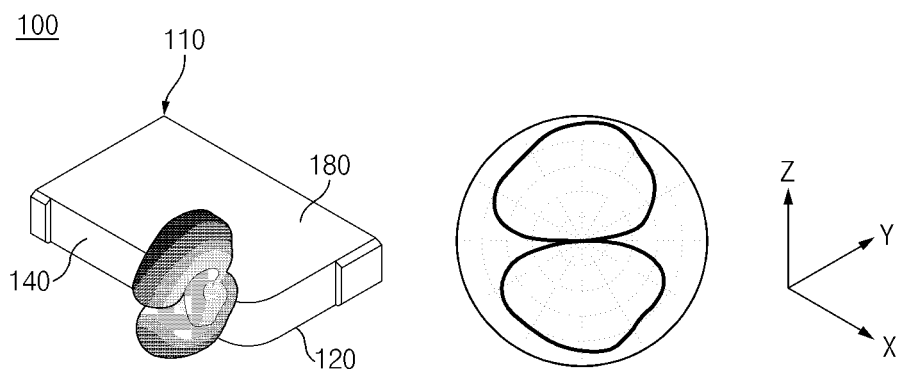

FIG. 13B shows a radiation pattern in the case where feeding signals of opposite phases are applied to the first antenna 211 and the second antenna 221. Unlike FIG. 13A, a radiation coverage may not be extended in the lateral direction of the electronic device 100 (e.g., in the −y-axis direction).

In various embodiments, a wireless communication circuit (e.g., the wireless communication circuit 290 of FIG. 6) may be configured to respectively apply a first feeding signal and a second feeding signal to the first antenna 211 and the second antenna 221 and to change phases of the first feeding signal and the second feeding signal.

Figure 13C:
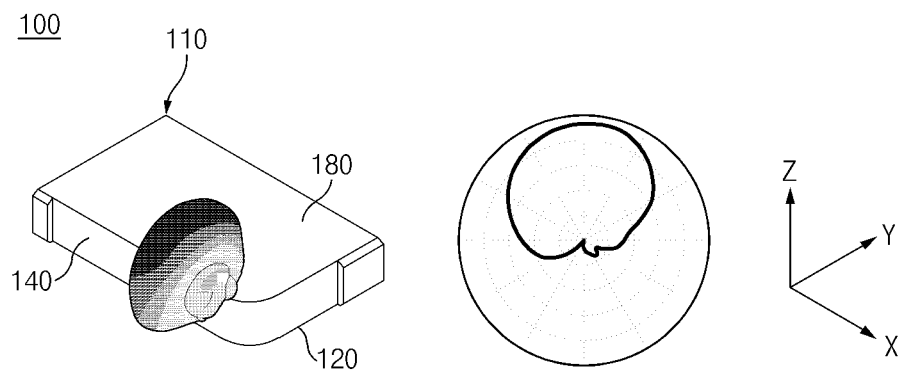
Figure 13D:
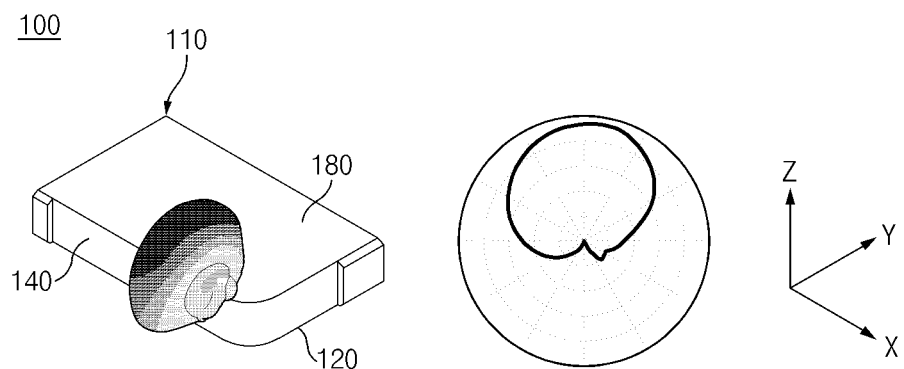

FIG. 13C shows a radiation pattern in the case where feeding signals of the same phase are applied to the first antenna 211 and the third antenna 231. FIG. 13D shows a radiation pattern in the case where feeding signals of opposite phases are applied to the first antenna 211 and the third antenna 231. Referring to FIGS. 13C and 13D, the first antenna 211 and the third antenna 231 may form substantially the same radiation coverage regardless of a phase of a feeding signal.

Figure 14A:
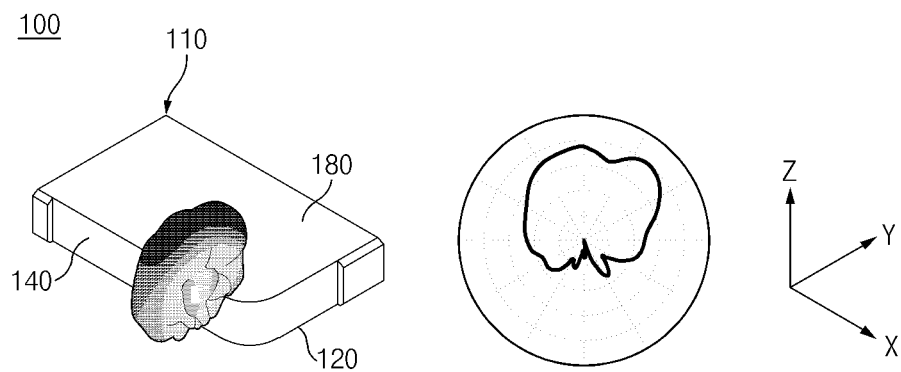
FIGS. 14A and 14B are diagrams illustrating radiation patterns when a fourth patch antenna and a fifth patch antenna included in an antenna substrate illustrated in FIG. 6 are individually fed.
Figure 14B:
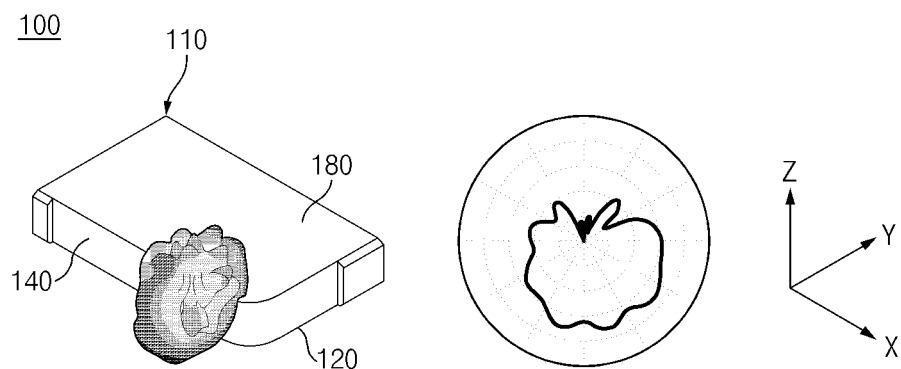

FIGS. 14A and 14B are diagrams illustrating radiation patterns when the fourth patch antenna 241 and the fifth patch antenna 251 included in the antenna substrate illustrated in FIG. 6 are individually fed.

FIG. 14A shows a radiation pattern in the case where the fourth patch antenna 241 is fed. FIG. 14B shows a radiation pattern in the case where the fifth patch antenna 251 is fed. Referring to FIG. 14A, because the fourth patch antenna 241 faces the rear surface of the electronic device 100, an output signal may pass through the second plate 180. Referring to FIG. 14B, because the fifth patch antenna 251 faces the front surface of the electronic device 100, an output signal may pass through the first plate 120.

Figure 15A:
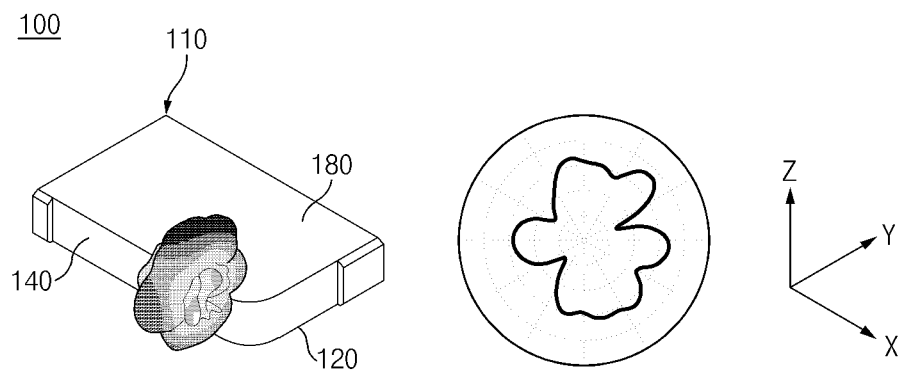
FIGS. 15A and 15B are diagrams illustrating radiation patterns when a fourth patch antenna and a fifth patch antenna included in an antenna substrate illustrated in FIG. 6 are fed together.
Figure 15B:
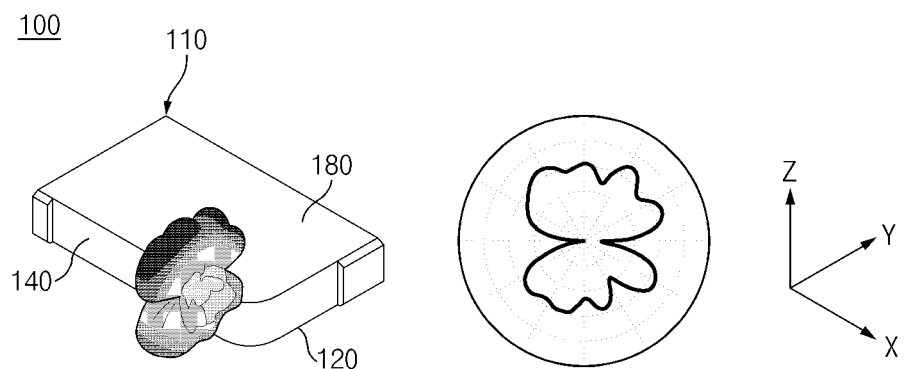

FIGS. 15A and 15B are diagrams illustrating radiation patterns when the fourth patch antenna 241 and the fifth patch antenna 251 included in the antenna substrate illustrated in FIG. 6 are fed together.

FIG. 15A shows a radiation pattern in the case where the fourth patch antenna 241 and the fifth patch antenna 251 are fed in the same phase. FIG. 15B shows a radiation pattern in the case where the fourth patch antenna 241 and the fifth patch antenna 251 are fed in opposite phases.

Referring to FIG. 15A, in the case where the fourth patch antenna 241 and the fifth patch antenna 251 are fed in the same phase, a portion of a radiation coverage may be formed in the lateral direction of the electronic device 100 (e.g., in the −y-axis direction).

Referring to FIG. 15B, in the case where the fourth patch antenna 241 and the fifth patch antenna 251 are fed in opposite phases, a relatively narrow radiation coverage may be formed in the forward direction and the rearward direction of the electronic device 100 compared to FIGS. 14A and 14B, but a relatively wide radiation coverage may be formed in the lateral direction of the electronic device 100 (e.g., in the −y-axis direction).

The radiation patterns respectively illustrated in FIGS. 15A and 15B may be understood as being formed by the interaction of the radiation pattern (e.g., the radiation pattern illustrated in FIG. 14A) that the fourth patch antenna 241 forms and the radiation pattern (e.g., the radiation pattern illustrated in FIG. 14B) that the fifth patch antenna 251 forms. The radiation coverage may be extended in the lateral direction of the electronic device 100 (e.g., the −y-axis direction) through the first plate 120 and the second plate 180.

Referring to FIGS. 15A and 15B, a wireless communication circuit (e.g., the wireless communication circuit 290 of FIG. 6) may form a radiation coverage extended in the lateral direction of the electronic device 100 (e.g., the −y-axis direction) through the first plate 120 and the second plate 180, by changing phases of feeding signals to be applied to the fourth patch antenna 241 and the fifth patch antenna 251.

Figure 16:
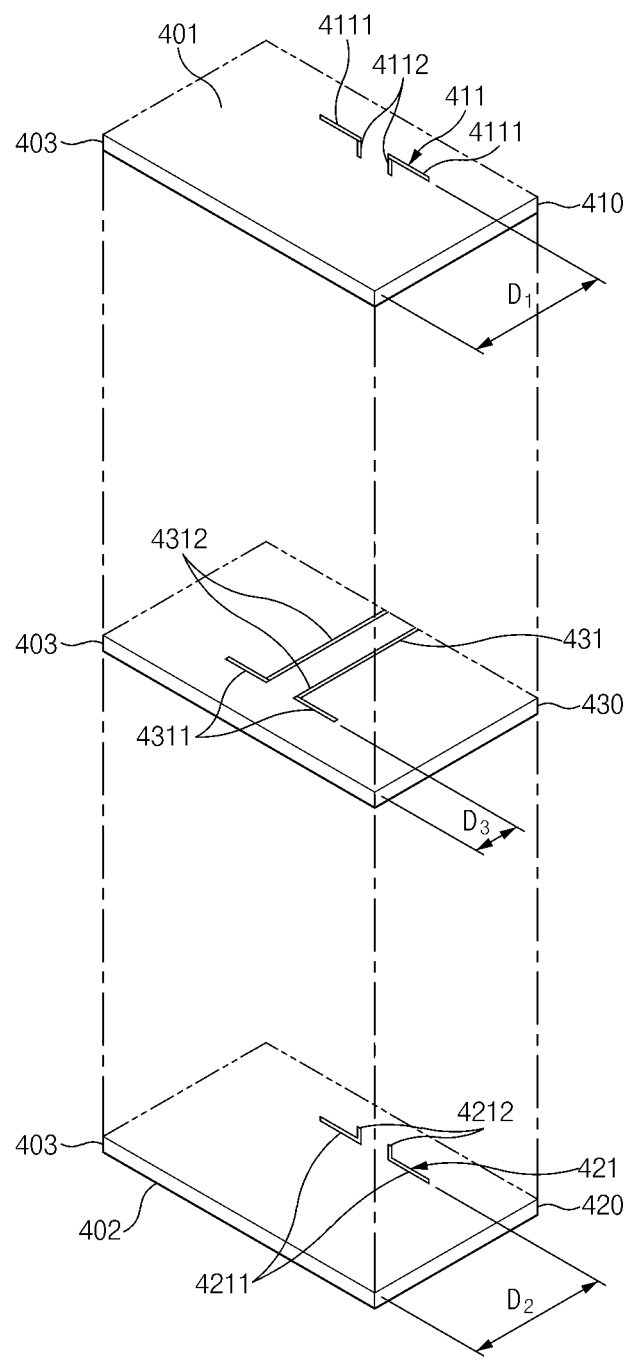
FIG. 16 is a view illustrating an antenna substrate of an electronic device, according to various embodiments.

FIG. 16 is a view illustrating an antenna substrate 400 of an electronic device, according to various embodiments.

Referring to FIG. 16, the antenna substrate 400 may include a first dipole antenna 411 (e.g., the first antenna 211 of FIG. 6) extended in the +z-axis direction), a second dipole antenna 421 (e.g., the second antenna 221 of FIG. 6) extended in the −z-axis direction), and a third dipole antenna 431 (e.g., the third antenna 231 of FIG. 6) extended in the −y-axis direction.

Here, extending directions of the dipole antennas 411, 421, and 431 may be defined as extending directions of feeding lines 4112, 4212, and 4312 respectively included in the dipole antennas 411, 421, and 431.

In the illustrated embodiment, the antenna substrate 400 may include a plurality of layers 410, 420, and 430. The plurality of layers 410, 420, and 430 may include a first layer 410 in which the first dipole antenna 411 is formed, a second layer 420 in which the second dipole antenna 421 is formed, and a third layer 430 in which the third dipole antenna 431 is formed. In this case, the first dipole antenna 411 may be extended to penetrate at least a part (e.g., the first layer 410) of the plurality of layers 410, 420, and 430. The second dipole antenna 421 may be extended to penetrate at least a part (e.g., the second layer 420) of the plurality of layers 410, 420, and 430.

In the in the illustrated embodiment, the antenna substrate 400 may include a first surface 401 facing the +z-axis direction, a second surface 402 facing the −z-axis direction, and a third surface 403 facing the −y-axis direction. In this case, the first dipole antenna 411 may be formed at a location spaced from the third surface 403 as much as the first distance $D_1$, the second dipole antenna 421 may be formed at a location spaced from the third surface 403 as much as the second distance $D_2$, and the third dipole antenna 431 may be formed at a location spaced from the third surface 403 as much as the third distance $D_3$.

In the illustrated embodiment, the third distance $D_3$ may be small compared to the first distance $D_1$ and the second distance $D_2$. That is, the third dipole antenna 431 may be formed adjacent to the third surface 403 compared to the first dipole antenna 411 and the second dipole antenna 421. Meanwhile, the first dipole antenna 411 and the second dipole antenna 421 may be formed at a location spaced from the third surface 403 as much as substantially the same distance.

In an embodiment, the first dipole antenna 411 may be extended in a rearward direction of an electronic device (e.g., the second plate 180 of FIG. 3). The second dipole antenna 421 may be extended in a forward direction of the electronic device (e.g., the first plate 120 of FIG. 3). The third dipole antenna 431 may be extended in a lateral direction of the electronic device (e.g., the side member 140 of FIG. 3).

Figure 17A:
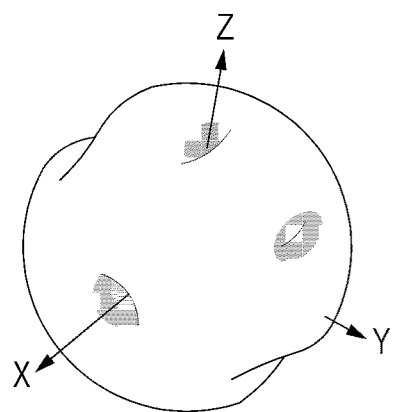
FIGS. 17A to 17C are diagrams illustrating radiation patterns when feeding signals are applied to dipole antennas illustrated in FIG. 16.
Figure 17B:
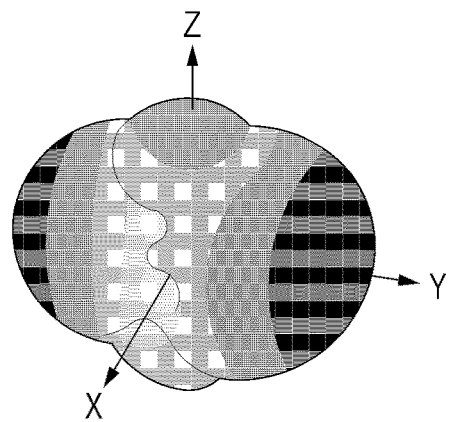
Figure 17C:
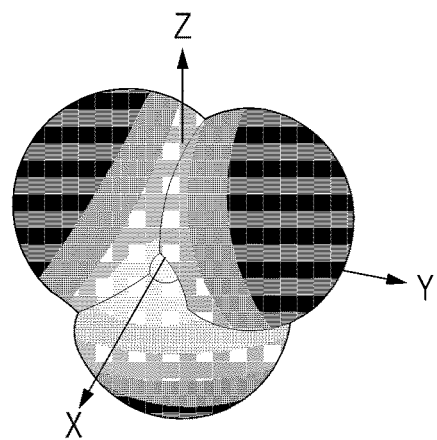

FIGS. 17A to 17C are diagrams illustrating radiation patterns when feeding signals are applied to the dipole antennas 411, 421, and 431 illustrated in FIG. 16.

In various embodiments, a wireless communication circuit (e.g., the wireless communication circuit 290 of FIG. 5) may apply a first feeding signal, a second feeding signal, and a third feeding signal to the first dipole antenna 411, the second dipole antenna 421, and the third dipole antenna 431, respectively. The wireless communication circuit may change a phase of each of the first feeding signal, the second feeding signal, and the third feeding signal.

In the illustrated embodiment, as a phase of a feeding signal to be applied to each of the dipole antennas 411, 421, and 431 is changed by a wireless communication circuit (e.g., the wireless communication circuit 290 of FIG. 5), the antenna substrate 400 may form various radiation patterns.

For example, FIG. 17A is a diagram illustrating a radiation pattern when the first feeding signal, the second feeding signal, and the third feeding signal are in phase. For example, all of the first feeding signal, the second feeding signal, and the third feeding signal may be currents of the same direction.

Referring to FIG. 17A, a radiation pattern may have a relatively high output signal in the y-axis direction, and may have a relatively low output signal in the z-axis and x-axis directions.

For example, FIG. 17B is a diagram illustrating a radiation pattern when a phase of the first feeding signal and the second feeding signal is opposite to a phase of the third feeding signal. For example, the third feeding signal may be a signal that has a phase delay of 180 degrees with respect to the first feeding signal and the second feeding signal.

Referring to FIG. 17B, a radiation pattern may have a relatively high output signal in the y-axis direction, and may have a relatively low output signal in the x-axis direction. Compared to the radiation pattern illustrated in FIG. 17A, the radiation pattern illustrated in FIG. 17B may have a high output signal in the z-axis direction and the y-axis direction.

Accordingly, to obtain a high output signal in the y-axis direction, the wireless communication circuit may change a phase of each feeding signal such that a phase of the third feeding signal is opposite to a phase of the first feeding signal and a phase of the second feeding signal.

For example, FIG. 17C is a diagram illustrating a radiation pattern when the first feeding signal, the second feeding signal, and the third feeding signal have uniform phase differences. For example, the second feeding signal may have a phase delay of 120 degrees with respect to the first feeding signal, the third feeding signal may have a phase delay of 120 degrees with respect to the second feeding signal, and the first feeding signal may have a phase delay of 120 degrees with respect to the third feeding signal.

Referring to FIG. 17C, there may be formed a radiation pattern that has a relatively high output signal in a direction between the y-axis direction and the z-axis direction and has a relatively low output signal in the x-axis direction.

FIGS. 18A to 20B are diagrams illustrating radiation patterns when feeding signals are applied to two dipole antennas of the antennas 411, 421, and 431 illustrated in FIG. 16.

In various embodiments, a wireless communication circuit (e.g., the wireless communication circuit 290 of FIG. 5) may apply a feeding signal to at least one of the first dipole antenna 411, the second dipole antenna 421, and the third dipole antenna 431. In various embodiments, the wireless communication circuit may change a phase of the feeding signal.

Figure 18A:
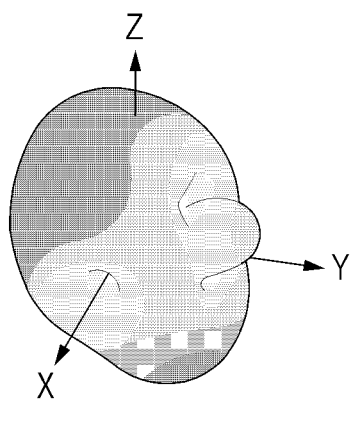
FIGS. 18A and 18B are diagrams illustrating radiation patterns when feeding signals are applied to a first dipole antenna and a third dipole antenna illustrated in FIG. 16.
Figure 18B:
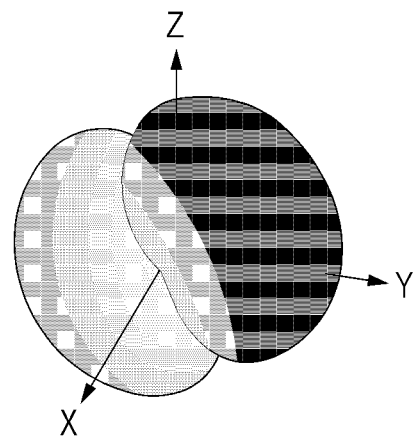

FIGS. 18A and 18B are diagrams illustrating radiation patterns when feeding signals are applied to the first dipole antenna 411 and the third dipole antenna 431 illustrated in FIG. 16.

In the illustrated embodiment, the first dipole antenna 411 may be extended in the +z-axis direction, and the third dipole antenna 431 may be extended in the −y-axis direction.

FIG. 18A is a diagram illustrating a radiation pattern when feeding signals of the same phase are applied to the first dipole antenna 411 and the third dipole antenna 431. In this case, a radiation pattern may have a relatively high output signal between the +z-axis direction and the −y-axis direction.

FIG. 18B is a diagram illustrating a radiation pattern when feeding signals of opposite phases are applied to the first dipole antenna 411 and the third dipole antenna 431. Unlike FIG. 18A, there may be formed a radiation pattern that has a relatively high output signal between the +z-axis direction and the +y-axis direction and between the −z-axis direction and the −y-axis direction.

Figure 19A:
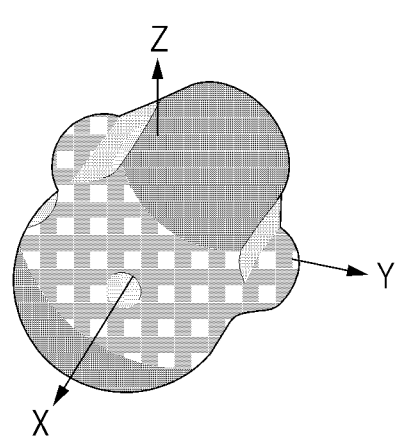
FIGS. 19A and 19B are diagrams illustrating radiation patterns when feeding signals are applied to a second dipole antenna and a third dipole antenna illustrated in FIG. 16.
Figure 19B:
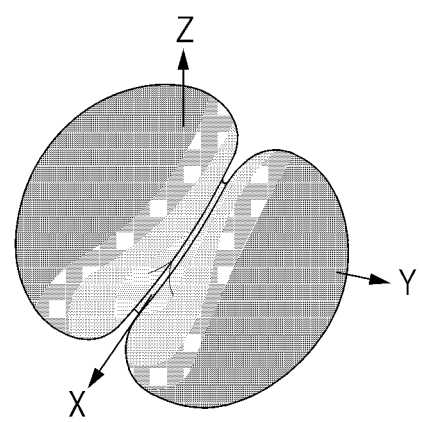

FIGS. 19A and 19B are diagrams illustrating radiation patterns when feeding signals are applied to the second dipole antenna 421 and the third dipole antenna 431 illustrated in FIG. 16.

In the illustrated embodiment, the second dipole antenna 421 may be extended in the −z-axis direction, and the third dipole antenna 431 may be extended in the −y-axis direction.

FIG. 19A is a diagram illustrating a radiation pattern when feeding signals of the same phase are applied to the second dipole antenna 421 and the third dipole antenna 431. A radiation pattern may have a relatively high output signal between the −z-axis direction and the −y-axis direction.

FIG. 19B is a diagram illustrating a radiation pattern when feeding signals of opposite phases are applied to the second dipole antenna 421 and the third dipole antenna 431. Unlike FIG. 19A, there may be formed a radiation pattern that has a relatively high output signal between the +z-axis direction and the −y-axis direction and between the −z-axis direction and the +y-axis direction.

The radiation pattern illustrated in FIG. 19A and the radiation pattern illustrated in FIG. 18A may be substantially symmetrical with respect to the x-y plane, and the radiation pattern illustrated in FIG. 19B and the radiation pattern illustrated in FIG. 18B may be substantially symmetrical with respect to the x-y plane. This may be understood as the first dipole antenna 411 and the second dipole antenna 421 are formed at locations symmetrical with respect to the x-y plane.

Figure 20A:
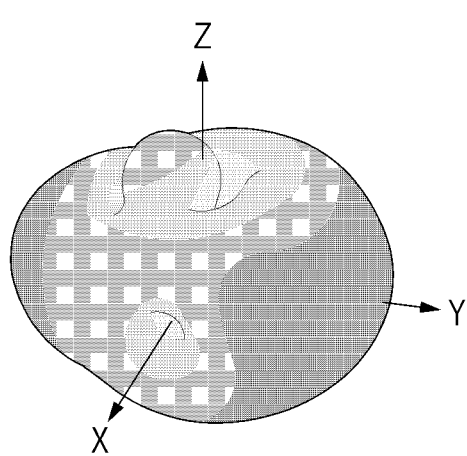
FIGS. 20A and 20B are diagrams illustrating radiation patterns when feeding signals are applied to a first dipole antenna and a second dipole antenna illustrated in FIG. 16.
Figure 20B:
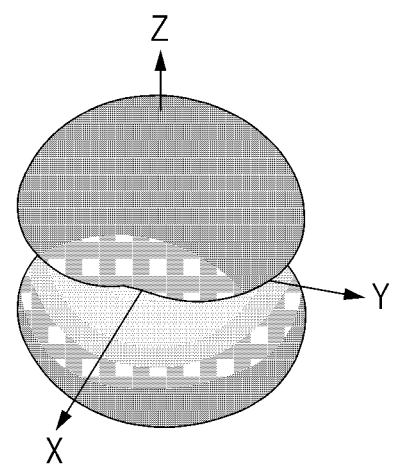

FIGS. 20A and 20B are diagrams illustrating radiation patterns when feeding signals are applied to the first dipole antenna 411 and the second dipole antenna 421 illustrated in FIG. 16.

In the illustrated embodiment, the first dipole antenna 411 may be extended in the +z-axis direction, and the second dipole antenna 421 may be extended in the −z-axis direction. The first dipole antenna 411 and the second dipole antenna 421 may be formed at locations symmetrical with respect to the x-y plane.

In the illustrated embodiment, radiation patterns may be substantially symmetrical with respect to the x-y plane.

FIG. 20A is a diagram illustrating a radiation pattern when feeding signals of the same phase are applied to the first dipole antenna 411 and the second dipole antenna 421. In this case, a radiation pattern may have a relatively high output signal in the +y-axis direction and the −y-axis direction.

FIG. 20B is a diagram illustrating a radiation pattern when feeding signals of opposite phases are applied to the first dipole antenna 411 and the second dipole antenna 421. In this case, a radiation pattern may have a relatively high output signal in the +z-axis direction and the −z-axis direction.

Figure 21:
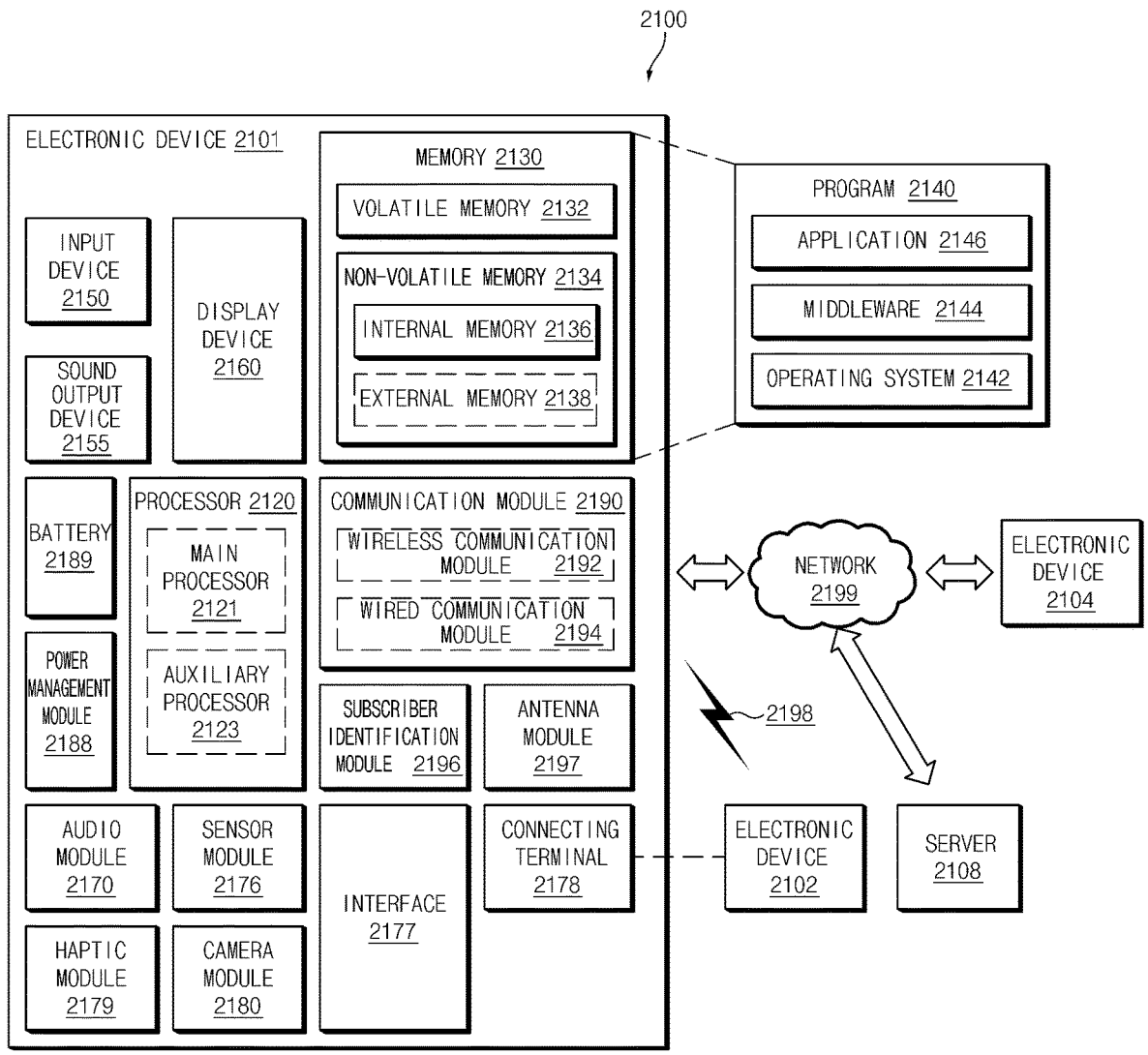
FIG. 21 is a block diagram of an electronic device in a network environment, according to various embodiments.

FIG. 21 is a block diagram illustrating an electronic device 2101 in a network environment 2100 according to various embodiments. Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 2101. In some embodiments, some of the components may be implemented as single integrated circuitry. For example, the sensor module 2176 (e.g., a fingerprint sensor, an iris sensor, or an illuminance sensor) may be implemented as embedded in the display device 2160 (e.g., a display).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 2121. Additionally or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display device 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by other component (e.g., the processor 2120) of the electronic device 2101, from the outside (e.g., a user) of the electronic device 2101. The input device 2150 may include, for example, a microphone, a mouse, a keyboard, or a digital pen (e.g., a stylus pen).

The sound output device 2155 may output sound signals to the outside of the electronic device 2101. The sound output device 2155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain the sound via the input device 2150, or output the sound via the sound output device 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., PCB). According to an embodiment, the antenna module 2197 may include a plurality of antennas. In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

Figure 22:
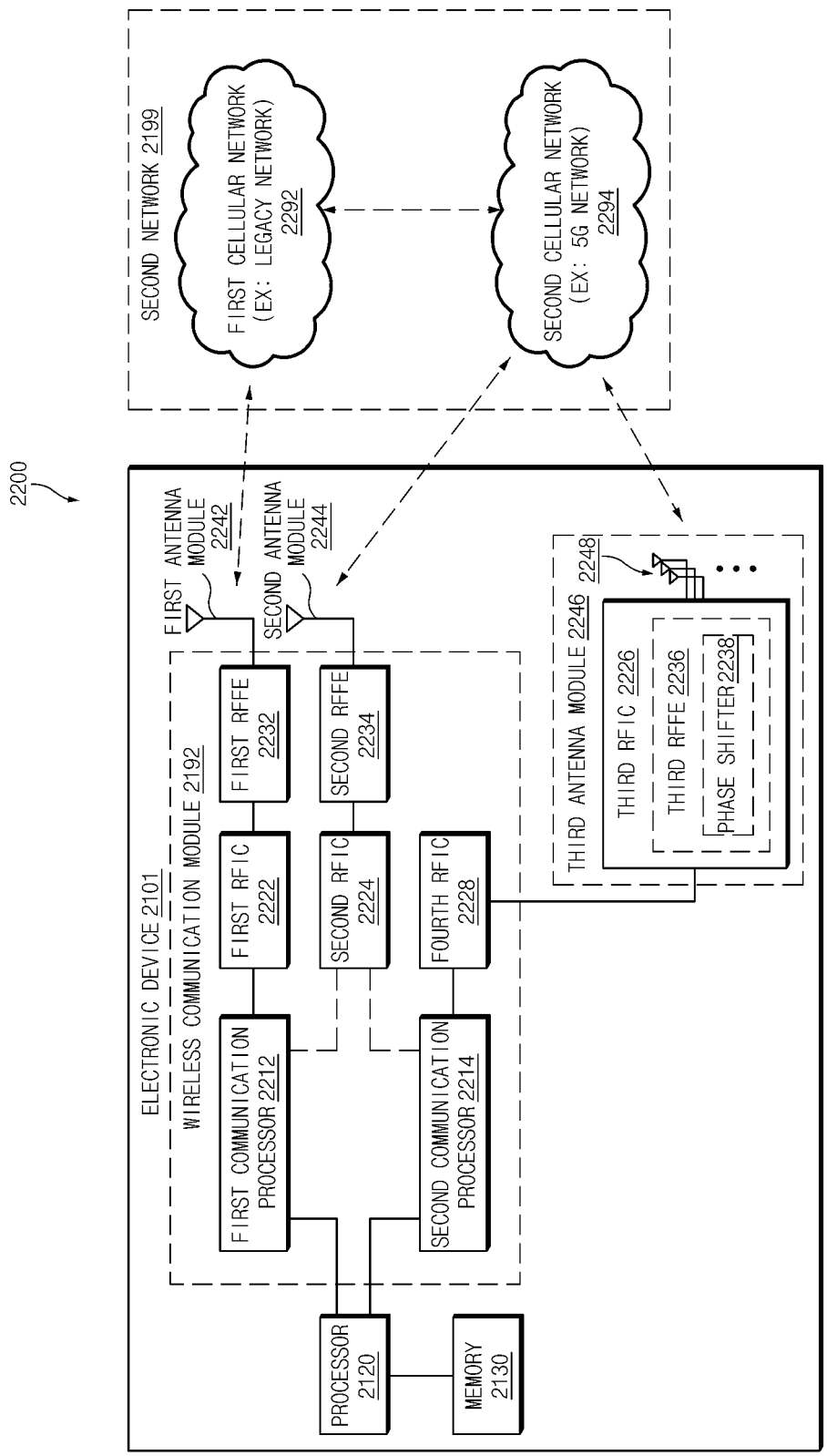
FIG. 22 is a block diagram of an electronic device for supporting legacy network communication and 5G network communication, according to various embodiments.

FIG. 22 is a block diagram 2200 of the electronic device 2101 for supporting legacy network communication and 5G network communication, according to various embodiments. Referring to FIG. 22, the electronic device 2101 may include a first communication processor 2212, a second communication processor 2214, a first radio frequency integrated circuit (RFIC) 2222, a second RFIC 2224, a third RFIC 2226, a fourth RFIC 2228, a first radio frequency front end (RFFE) 2232, a second RFFE 2234, a first antenna module 2242, a second antenna module 2244, and an antenna 2248. The electronic device 2101 may further include the processor 2120 and the memory 2130. The second network 2199 may include a first cellular network 2292 and a second cellular network 2294. According to another embodiment, the electronic device 2101 may further include at least one component of the components illustrated in FIG. 21, and the second network 2199 may further include at least another network. According to an embodiment, the first communication processor 2212, the second communication processor 2214, the first RFIC 2222, the second RFIC 2224, the fourth RFIC 2228, the first RFFE 2232, and the second RFFE 2234 may form at least a part of the wireless communication module 2192. According to another embodiment, the fourth RFIC 2228 may be omitted or may be included as a part of the third RFIC 2226.

The first communication processor 2212 may establish a communication channel of a band to be used for wireless communication with the first cellular network 2292 and may support legacy network communication over the established communication channel. According to various embodiments, the first cellular network 2292 may be a legacy network including a 2G, 3G, 4G, and/or long term evolution (LTE) network. The second communication processor 2214 may establish a communication channel corresponding to a specified band (e.g., approximately 6 GHz to approximately 100 GHz) of bands to be used for wireless communication with the second cellular network 2294 and may support the 5G network communication over the established communication channel. According to various embodiments, the second cellular network 2294 may be a 5G network defined in the 3GPP. Additionally, according to an embodiment, the first communication processor 2212 or the second communication processor 2214 may establish a communication channel for a specified band (e.g., approximately 6 GHz or lower) of the bands to be used for wireless communication with the second cellular network 2294 and may support 5G network communication through the established communication channel. According to an embodiment, the first communication processor 2212 and the second communication processor 2214 may be implemented in a single chip or a single package. According to various embodiments, the first communication processor 2212 or the second communication processor 2214 may be implemented in a single chip or a single package together with the processor 2120, the auxiliary processor 2123, or the communication module 2190.

In the case of transmitting a signal, the first RFIC 2222 may convert a baseband signal generated by the first communication processor 2212 into a radio frequency (RF) signal of approximately 700 MHz to approximately 3 GHz that is used in the first cellular network 2292 (e.g., a legacy network). In the case of receiving a signal, an RF signal may be obtained from the first cellular network 2292 (e.g., a legacy network) through an antenna (e.g., the first antenna module 2242) and may be pre-processed through an RFFE (e.g., the first RFFE 2232). The first RFIC 2222 may convert the pre-processed RF signal into a baseband signal so as to be processed by the first communication processor 2212.

In the case of transmitting a signal, the second RFIC 2224 may convert a baseband signal generated by the first communication processor 2212 or the second communication processor 2214 into an RF signal (hereinafter referred to as a "5G Sub6 RF signal") in a Sub6 band (e.g., approximately 6 GHz or lower) used in the second cellular network 2294 (e.g., a 5G network). In the case of receiving a signal, a 5G Sub6 RF signal may be obtained from the second cellular network 2294 (e.g., a 5G network) through an antenna (e.g., the second antenna module 2244) and may be pre-processed through an RFFE (e.g., the second RFFE 2234). The second RFIC 2224 may convert the pre-processed 5G Sub6 RF signal into a baseband signal so as to be processed by a corresponding communication processor of the first communication processor 2212 or the second communication processor 2214.

The third RFIC 2226 may convert a baseband signal generated by the second communication processor 2214 into an RF signal (hereinafter referred to as a "5G Above6 RF signal") in a 5G Above6 band (e.g., approximately 6 GHz to approximately 60 GHz) to be used in the second cellular network 2294 (e.g., a 5G network). In the case of receiving a signal, a 5G Above6 RF signal may be obtained from the second cellular network 2294 (e.g., a 5G network) through an antenna (e.g., the antenna 2248) and may be pre-processed through a third RFFE 2236. The third RFIC 2226 may convert the pre-processed 5G Above6 RF signal into a baseband signal so as to be processed by the second communication processor 2214. According to an embodiment, the third RFFE 2236 may be implemented as a part of the third RFIC 2226.

According to an embodiment, the electronic device 2101 may include the fourth RFIC 2228 independently of the third RFIC 2226 or as at least a part of the third RFIC 2226. In this case, the fourth RFIC 2228 may convert a baseband signal generated by the second communication processor 2214 into an RF signal (hereinafter referred to as an "IF signal") in an intermediate frequency band (e.g., approximately 9 GHz to approximately 11 GHz) and may provide the IF signal to the third RFIC 2226. The third RFIC 2226 may convert the IF signal into a 5G Above6 RF signal. In the case of receiving a signal, a 5G Above6 RF signal may be received from the second cellular network 2294 (e.g., a 5G network) through an antenna (e.g., the third antenna 2248) and may be converted into an IF signal by the third RFIC 2226. The fourth RFIC 2228 may convert the IF signal into a baseband signal so as to be processed by the second communication processor 2214.

According to an embodiment, the first RFIC 2222 and the second RFIC 2224 may be implemented as a part of a single package or a single chip. According to an embodiment, the first RFFE 2232 and the second RFFE 2234 may be implemented as a part of a single package or a single chip. According to an embodiment, at least one of the first antenna module 2242 or the second antenna module 2244 may be omitted or may be combined with any other antenna module to process RF signals in a plurality of bands corresponding thereto.

According to an embodiment, the third RFIC 2226 and the antenna 2248 may be disposed at the same substrate to form a third antenna module 2246. For example, the wireless communication module 2192 or the processor 2120 may be disposed on a first substrate (e.g., a main PCB). In this case, the third RFIC 2226 may be disposed in a partial region (e.g., on a lower surface) of a second substrate (e.g., a sub PCB) independent of the first substrate, and the antenna 2248 may be disposed in another partial region (e.g., on an upper surface) of the second substrate. As such, the third antenna module 2246 may be formed. According to an embodiment, the antenna 2248 may include, for example, an antenna array to be used for beamforming. As the third RFIC 2226 and the antenna 2248 are disposed at the same substrate, it may be possible to decrease a length of a transmission line between the third RFIC 2226 and the antenna 2248. For example, the decrease in the transmission line may make it possible to prevent a signal in a high-frequency band (e.g., approximately 6 GHz to approximately 60 GHz) used for 5G network communication from being lost (or attenuated) due to the transmission line. As such, the electronic device 2101 may improve the quality or speed of communication with the second cellular network 2294 (e.g., a 5G network).

The second cellular network 2294 (e.g., a 5G network) may be used independently of the first cellular network 2292 (e.g., a legacy network) (e.g., this scheme being called "stand-alone (SA)") or may be used in connection with the first cellular network 2292 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 2101 may access the access network of the 5G network and may then access an external network (e.g., an Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 2130 so as to be accessed by any other component (e.g., the processor 2120, the first communication processor 2212, or the second communication processor 2214).

Figures 23A, 23B:
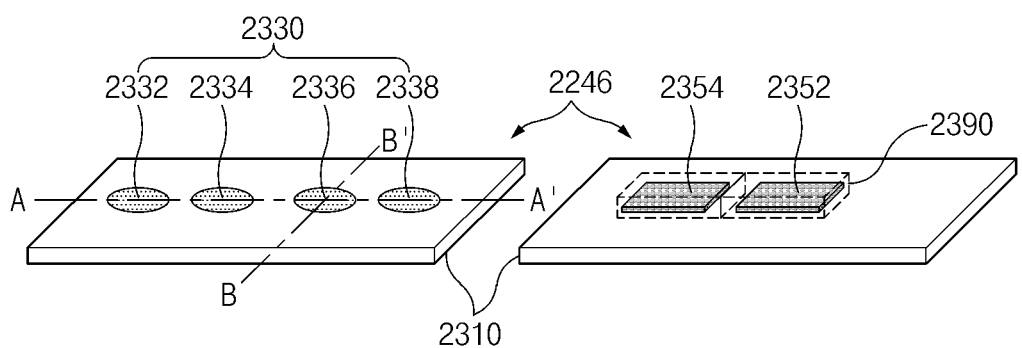
FIGS. 23A to 23C illustrates an embodiment of a structure of a third antenna module described with reference to FIG. 22, for example.
Figure 23C:
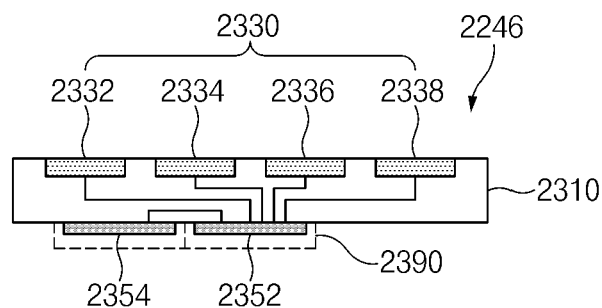

FIGS. 23A to 23C illustrate an embodiment of the third antenna module 2246 described with reference to FIG. 22, for example. FIG. 23A is a perspective view of the third antenna module 2246 when viewed from one side, and FIG. 23B is a perspective view of the third antenna module 2246 when viewed from another side. FIG. 23C is a cross-sectional view of the third antenna module 2246 taken along line A-A'.

Referring to FIGS. 23A to 23C, in an embodiment, the third antenna module 2246 may include a printed circuit board 2310, an antenna array 2330, a radio frequency integrate circuit (RFIC) 2352, a power manage integrated circuit (PMIC) 2354, and a module interface. Selectively, the third antenna module 2246 may further include a shielding member 2390. In various embodiments, at least one of the above components may be omitted, or at least two of the components may be integrally formed.

The printed circuit board 2310 may include a plurality of conductive layers and a plurality of non-conductive layers, and the conductive layers and the non-conductive layers may be alternately stacked. The printed circuit board 2310 may provide an electrical connection between the printed circuit board 2310 and/or various electronic components disposed on the outside by using wires and conductive vias formed in the conductive layers.

The antenna array 2330 (e.g., 2248 of FIG. 22) may include a plurality of antenna elements 2332, 2334, 2336, or 2338 disposed to form a directional beam. The antenna elements may be formed on a first surface of the printed circuit board 2310 as illustrated. According to various embodiments, the antenna array 2330 may be formed within the printed circuit board 2310. According to embodiments, the antenna array 2330 may include a plurality of antenna arrays (e.g., a dipole antenna array and/or a patch antenna array), of which shapes or kinds are identical or different.

The RFIC 2352 (e.g., 2226 of FIG. 22) may be disposed in another region (e.g., on a second surface facing away from the first surface) of the printed circuit board 2310, which is spaced apart from the antenna array. The RFIC 2352 may be configured to process a signal in the selected frequency band, which is transmitted/received through the antenna array 2330. According to an embodiment, in the case of transmitting a signal, the RFIC 2352 may convert a baseband signal obtained from a communication processor (not illustrated) into an RF signal in a specified band. In the case of receiving a signal, the RFIC 2352 may convert an RF signal received through the antenna array 2330 into a baseband signal and may provide the baseband signal to the communication processor.

According to another embodiment, in the case of transmitting a signal, the RFIC 2352 may up-convert an IF signal (e.g., approximately 9 GHz to approximately 11 GHz) obtained from an intermediate frequency integrated circuit (IFIC) (e.g., 2228 of FIG. 22) into an RF signal. In the case of receiving a signal, the RFIC 2352 may down-convert an RF signal obtained through the antenna array 2330 into an IF signal and may provide the IF signal to the IFIC.

The PMIC 2354 may be disposed in another region (e.g., on the second surface) of the printed circuit board 2310, which is spaced from the antenna array 2330. The PMIC 2354 may be supplied with a voltage from a main PCB (not illustrated) and may provide a power necessary for various components (e.g., the RFIC 2352) on an antenna module.

The shielding member 2390 may be disposed at a portion (e.g., on the second surface) of the printed circuit board 2310 such that at least one of the RFIC 2352 or the PMIC 2354 is electromagnetically shielded. According to an embodiment, the shielding member 2390 may include a shield can.

Although not illustrated in drawings, in various embodiments, the third antenna module 2246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 2352 and/or the PMIC 2354 of the antenna module may be electrically connected with the printed circuit board 2310 through the connection member.

Figure 24:
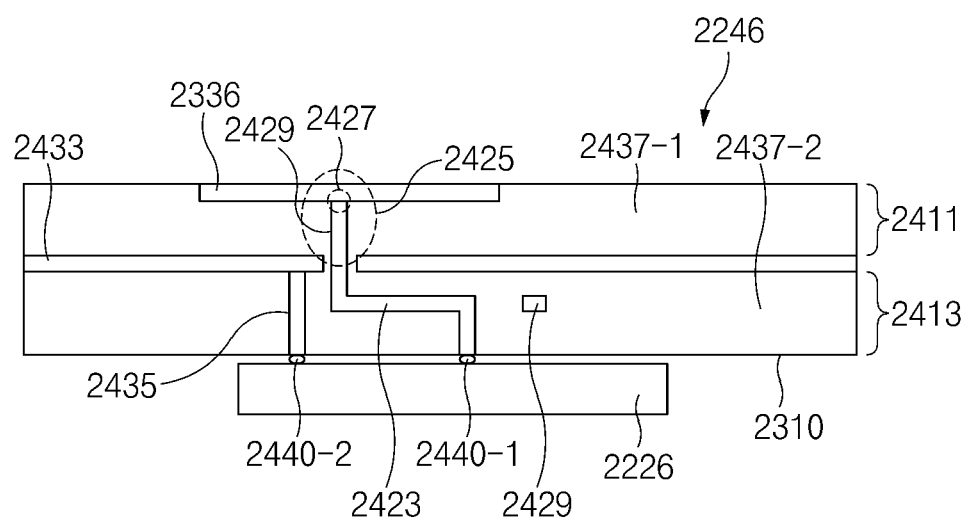
FIG. 24 illustrates a cross-sectional view of a third antenna module taken along line B-B' of FIG. 23A.

FIG. 24 illustrates a cross-sectional view of the third antenna module 2246 taken along line B-B' of FIG. 23A. The printed circuit board 2310 of the embodiment illustrated may include an antenna layer 2411 and a network layer 2413.

The antenna layer 2411 may include at least one dielectric layer 2437-1, and the antenna element 2336 and/or a feeding part 2425 formed on an outer surface of the dielectric layer or therein. The feeding part 2425 may include a feeding point 2427 and/or a feeding line 2429.

The network layer 2413 may include at least one dielectric layer 2437-2; and at least one ground layer 2433, at least one conductive via 2435, a transmission line 2423, and/or a signal line 2429 formed on an outer surface of the dielectric layer or therein.

In addition, in the embodiment illustrated, the third RFIC 2226 of FIG. 23C may be electrically connected with the network layer 2413, for example, through first and second connection parts (e.g., solder bumps) 2440-1 and 2440-2. In other embodiments, various connection structures (e.g., soldering or a BGA) may be utilized instead of the connection parts 2440-1 and 2440-2. The third RFIC 2226 may be electrically connected with the antenna element 2336 through the first connection part 2440-1, the transmission line 2423, and the feeding part 2425. Also, the third RFIC 2226 may be electrically connected with the ground layer 2433 through the second connection part 2440-2 and the conductive via 2435. Although not illustrated in drawings, the third RFIC 2226 may also be electrically connected with the above module interface through the signal line 2429.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing including a first plate including a first planar region facing a first direction, a second plate including a second planar region facing a second direction opposite to the first direction, and a side member surrounding an inner space between the first plate and the second plate;
a display disposed between the first plate and the second plate and viewable through the first plate; and
an antenna module disposed between the display and the second plate and configured to radiate a radio wave to the outside of the housing,
wherein the antenna module includes:
an antenna substrate including a first surface facing the first plate, a second surface facing the second plate, and a third surface facing an inner surface of the side member; and
a wireless communication circuit disposed on the first surface of the antenna substrate,
wherein the antenna substrate includes:
a first antenna formed adjacent to the first surface or formed on the first surface;
a second antenna formed adjacent to the second surface or formed on the second surface; and
a third antenna formed between the first antenna and the second antenna,
wherein the first antenna is formed at a first distance from the third surface,
wherein the second antenna is formed at a second distance from the third surface, and
wherein the third antenna is formed at a third distance, which is smaller than the first distance and the second distance, from the third surface.

2. The electronic device of claim 1, wherein the antenna substrate is disposed in the inner space such that the first surface faces the first direction, the second surface faces the second direction, and the third surface faces a third direction perpendicular to the first direction and the second direction.

3. The electronic device of claim 2, wherein each of the first distance, the second distance, and the third distance is a distance measured along the third direction from the third surface of the antenna substrate.

4. The electronic device of claim 1, wherein the third antenna includes a third dipole antenna extended in a direction facing the inner surface of the side member.

5. The electronic device of claim 4, wherein the antenna substrate includes:
a fourth patch antenna formed between the first antenna and the third antenna and facing the first plate; and
a fifth patch antenna formed between the second antenna and the third antenna and facing the second plate.

6. The electronic device of claim 5, wherein a feeding signal is applied to one of the fourth patch antenna and the fifth patch antenna, and a ground signal is applied to the other thereof.

7. The electronic device of claim 1, wherein the first antenna includes a first dipole antenna extended in a direction facing the first plate, and
wherein the second antenna includes a second dipole antenna extended in a direction facing the second plate.

8. The electronic device of claim 7, wherein each of the first dipole antenna and the second dipole antenna includes a via penetrating a portion of the antenna substrate.

9. The electronic device of claim 1, wherein the antenna substrate includes:
a fourth patch antenna formed between the first antenna and the third antenna and facing the first plate; and
a fifth patch antenna formed between the second antenna and the third antenna and facing the second plate,
wherein the first antenna is formed to be partially aligned with the fourth patch antenna, and
wherein the second antenna is formed to be partially aligned with the fifth patch antenna.

10. The electronic device of claim 9, wherein the first antenna includes a first dipole antenna extended in a direction facing the first plate,
wherein the second antenna includes a second dipole antenna extended in a direction facing the second plate,
wherein a first opening into which at least a portion of the first dipole antenna is extended is formed in the fourth patch antenna, and
wherein a second opening into which at least a portion of the second dipole antenna is extended is formed in the fifth patch antenna.

11. The electronic device of claim 1, wherein the antenna substrate includes:
a fourth patch antenna formed between the first antenna and the third antenna and facing the first plate; and
a fifth patch antenna formed between the second antenna and the third antenna and facing the second plate,
wherein the wireless communication circuit is configured to apply a first signal, a second signal, a third signal, a fourth signal, and a fifth signal to the first antenna, the second antenna, the third antenna, the fourth patch antenna, and the fifth patch antenna, respectively, and wherein the communication module controls a radiation direction of the antenna module by changing a phase of at least one of the first signal, the second signal, the third signal, the fourth signal, and the fifth signal.

12. The electronic device of claim 1, wherein the first antenna includes:
a first patch antenna facing the first plate; and
a first ground region formed between the first patch antenna and the third antenna, and
wherein the second antenna includes:
a second patch antenna facing the second plate; and
a second ground region formed between the second patch antenna and the third antenna.

13. The electronic device of claim 12, wherein the third antenna includes a third dipole antenna formed between the first ground region and the third ground region and extended in a direction facing the inner surface of the side member.

14. The electronic device of claim 1, wherein the antenna substrate includes a multi-layer structure,
wherein the multi-layer structure includes:
a first layer in which the first antenna is formed;
a second layer in which the second antenna is formed; and
a third layer in which the third antenna is formed,
wherein the first antenna includes a first dipole antenna penetrating the first layer and extended toward the first surface,
wherein the second antenna includes a second dipole antenna penetrating the second layer and extended toward the second surface, and
wherein the third antenna includes a third dipole antenna formed on a surface of the third layer.

15. An electronic device comprising:
a first plate forming a first surface of the electronic device;
a second plate forming a second surface of the electronic device and facing away from the first plate;
a side member forming a side surface of the electronic device, formed between the first plate and the second plate, and including a metal material;
a display disposed between the first plate and the second plate and viewable through the first plate;
an antenna substrate disposed between the display and the second plate and including a plurality of antennas; and
a wireless communication circuit electrically connected with the plurality of antennas and disposed on one surface of the antenna substrate,
wherein the plurality of antennas include:
a first dipole antenna extended toward the second plate;
a second dipole antenna extended toward the first plate; and
a third dipole antenna extended toward an inner surface of the side member and located more adjacent to the inner surface of the side member than the first dipole antenna and the second dipole antenna, and
wherein the wireless communication circuit is configured to apply feeding signals to at least two of the plurality of antennas such that a beam coverage formed by the plurality of antennas is toward a side surface of the electronic device.

* * * * *